US008949819B2

(12) United States Patent
Allam et al.

(10) Patent No.: US 8,949,819 B2
(45) Date of Patent: Feb. 3, 2015

(54) RATIONALIZING FUNCTIONS TO IDENTIFY RE-USABLE SERVICES

(71) Applicant: International Business Machines Corporation, Armonk, NY (US)

(72) Inventors: Abdul Allam, Raleigh, NC (US); Jaime M. Gonzalez Lojero, Jalisco (MX); Jesus Godinez Ramirez, Distrito Federal (MX); Francisco R. Huizar Rodriguez, Jalisco (MX)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 13/628,507

(22) Filed: Sep. 27, 2012

(65) Prior Publication Data

US 2014/0089911 A1    Mar. 27, 2014

(51) Int. Cl.
*G06F 9/44* (2006.01)
*G06F 15/177* (2006.01)

(52) U.S. Cl.
USPC ........................... 717/171; 717/168; 709/220

(58) Field of Classification Search
CPC ......... G06F 8/65; G06F 8/67; G06F 11/1433; H04L 41/082; H04L 41/0803
See application file for complete search history.

(56) References Cited

U.S. PATENT DOCUMENTS

| | | | |
|---|---|---|---|
| 6,314,565 B1* | 11/2001 | Kenner et al. ............... | 717/171 |
| 6,457,076 B1* | 9/2002 | Cheng et al. ................. | 709/220 |
| 7,159,185 B1 | 1/2007 | Vedula et al. | |
| 7,194,485 B2 | 3/2007 | Kaipa et al. | |
| 7,581,205 B1 | 8/2009 | Massoudi | |
| 8,087,013 B2* | 12/2011 | Kelly et al. .................... | 717/171 |
| 8,209,676 B2* | 6/2012 | Kapadekar et al. ........... | 717/171 |
| 2004/0177335 A1 | 9/2004 | Beislegel et al. | |
| 2005/0273779 A1* | 12/2005 | Cheng et al. .................. | 717/168 |
| 2008/0005732 A1* | 1/2008 | Coon ............................ | 717/168 |
| 2008/0126147 A1 | 5/2008 | Ang et al. | |
| 2009/0222429 A1 | 9/2009 | Aizenbud-Reshef et al. | |
| 2009/0328028 A1* | 12/2009 | O'Rourke et al. ............ | 717/168 |
| 2010/0071028 A1 | 3/2010 | Brown et al. | |
| 2010/0138254 A1 | 6/2010 | Brown et al. | |
| 2010/0305986 A1 | 12/2010 | Ponnalagu et al. | |
| 2010/0312590 A1 | 12/2010 | Arunachalam et al. | |
| 2010/0312781 A1 | 12/2010 | Arunachalam et al. | |

(Continued)

OTHER PUBLICATIONS

David Mennie and Bernard Pagurek; An Architecture to Support Dynamic Composition of Service Components; 2000; retrieved online on Sep. 18, 2014; pp. 1-8; Retrieved from the Internet: <URL: http://www.sce.carleton.ca/netmanage/papers/An%20Architecture%20to%20Support%20%20Dynamic%20Composition%20of%20Service%20Components.pdf>.*

(Continued)

*Primary Examiner* — Thuy Dao
*Assistant Examiner* — Hanh T Bui
(74) *Attorney, Agent, or Firm* — Brown & Michaels, PC; Ronald A. Kaschak

(57) ABSTRACT

A method of dynamically offering upgraded services in a network comprising functions, the method comprising a computer performing the steps of: applying a similar functionality analysis on the functions of a network; retrieving the plurality of functions stored by the similar functionality analysis from the repository, and creating a pivot table; categorizing the functions within the pivot table; filtering the pivot table by a functional area of the pivot table; recreating the pivot table based on the functional area; and differentiating the exposable functions within the pivot table from non-exposable functions by attributes of the functions.

15 Claims, 23 Drawing Sheets

(56) References Cited

U.S. PATENT DOCUMENTS

| | | | |
|---|---|---|---|
| 2011/0191745 A1 | 8/2011 | Allam et al. | |
| 2012/0210315 A1* | 8/2012 | Kapadekar et al. | 717/171 |
| 2013/0166703 A1* | 6/2013 | Hammer et al. | 709/220 |

OTHER PUBLICATIONS

Steve MacDonald et al.; Deferring Design Pattern Decisions and Automating Structural Pattern Changes Using a Design-Pattern-Based Programming System; 2009; ACM; retrieved online on Sep. 18, 2014; pp. 9:1-9:49; Retrieved from the Internet: <URL: http://delivery.acm.org/10.1145/1500000/1498927/a9-macdonald.pdf?ip=151.207.250.61&id=1498927&acc=ACTIVE%2>.*

Rezvan Mahmoudie and Saeed Parsa; Remodularization of Mobile Software System for Increasing the Quality of Service and Decreasing the Required Resources in the Network; 2010; IEEE; retrieved online on Sep. 18, 2014; pp. 319-323; Retrieved from the Internet: <URL: http://ieeexplore.ieee.org/stamp/stamp.jsp?tp=&arnumber=5445816>.*

Arsanjani, A. et al.; SOMA: A method for developing service-oriented solutions; IBM Systems Journal, vol. 47; No. 3; 2008; pp. 337-396.

Park, J. et al.; An Approach to Developing Reusable Domain Services for Service Oriented Applications; SAC'10, Mar. 22-26, 2010; pp. 2252-2256.

Feuerlicht, G. et al.; Understanding Service Reusability; Systems Integration; 2007; pp. 144-150.

Decision support tool based on Skill Mapping; IP.com; www.ip.com; 2010; 10 pages.

Office Action mailed Sep. 26, 2012 for U.S. Appl. No. 12/698,401 corresponding to US2011/0191745.

* cited by examiner

Fig. 13

| No. | Candidate Service Name | Description | Action | Unified Function Name |
|---|---|---|---|---|
| 1 | getOperatorBySoeid_FS | Gets operators that matches Soeid | Accepted | |
| 2 | getOperatorByExperienceLevel_FS | Gets operators that matches an specific experience | Accepted | |
| 3 | getOperatorByGeid_FS | Gets operators that matches Geid | Accepted | |
| 4 | getAvailableOperator_FS | Gets available operators defined in business rules from 313-RN4 | Accepted | |
| 5 | getOperator_FS | Gets any operator | Added | |
| 6 | getSampleRepository_FS | Gets all samples generated by the batch process, Jetf in the repository | Unified | getSamples_FS |
| 7 | getDataFromSample_FS | Gets registers from samples. They will be shown in screen 421-PA006 | Unified | getSamples_FS |
| 8 | getEvidenceFromSample_FS | Gets in history section the samples validated previously | Unified | getSamples_FS |
| 9 | getSamples_FS | Gets samples to validate results from batch process | Added | |

Only Added or Accepted service names can be moved to the Pivot tab

Fig. 15

Select a single Functional Area to filter related functions or candidate services

Fig. 18

RATIONALIZING FUNCTIONS TO IDENTIFY RE-USABLE SERVICES

BACKGROUND

The present invention relates to services, and more specifically to rationalizing functions to identify re-usable services.

Service Oriented Architecture (SOA) solutions are business process driven and are required to support business functions in various functional areas. A functional area is a logical grouping of related or cohesive functions. Key objectives of SOA are identification and design of services which are re-usable and flexible to accommodate variations that a business must support in order to be agile. In a medium to large size SOA projects, normally there are different teams who are assigned specific business processes and functional areas to analyze with the intent to identify re-usable and flexible services (i.e. services which can support variations). In this distributed work environment, analysis often results in duplicate functions being identified by various teams. If the number of functional areas is large there is a potential for significant amount of duplication. If there is no mechanism or technique to identify and consolidate or eliminate these duplicate functions, a large number of candidate services that support or perform same functions are identified.

The focus in SOA is on identifying services that need to be exposed. A service modeling toolkit such as IBM's SOMA-ME-Service Oriented Modeling Architecture Modeling Environment, is used to rationalize which services need to be exposed and which should not be exposed to consumers within and outside of an enterprise. The toolkit, though it automates the process of prioritizing and ranking services to help decide which services to be exposed, it still requires business and IT team members to apply every question (in the toolkit) and associated scores to each and every candidate service. This can take a significant amount of time if the number of candidate services is large (i.e. candidate services >500) due to duplication.

SUMMARY

According to one embodiment of the present invention a method of dynamically offering upgraded services in a network comprising functions. The method comprising a computer performing the steps of: a) applying a similar functionality analysis on the functions of a network; b) retrieving the plurality of functions stored by the similar functionality analysis from the repository, and creating a pivot table; c) categorizing the functions within the pivot table; d) filtering the pivot table by a functional area of the pivot table; e) recreating the pivot table based on the functional area; and f) differentiating the exposable functions within the pivot table from non-exposable functions by attributes of the functions. Step a) of applying a similar functionality analysis on the functions of the network further comprising the steps of the computer: i) retrieving a plurality of candidate services from the network, each functions having a description, at least one attribute, and a name; ii) for each function, determining whether the name is the same or similar to a name of another function and if name is not the same or similar to any other function, continuing with the analysis at step (a)(vi); iii) for each function, determining whether the description is the same or similar to a description of another function; and if the description of a function is not the same or similar to the description of another function, determining whether the name of the function correspond to a filter used in the network, if the name of the function corresponds to a filter used in the network, continuing with the analysis at step (a)(viii); otherwise continuing with the analysis at step (a)(vi); iv) determining whether there is a common name which can represent the plurality of functions being compared; if there is a common name which can represent the plurality of functions being compared, linking each of the plurality of functions with the common name and continuing with the analysis at step (a)(ix); v) for all functions which are not linked to a common name, continuing with the analysis at step (a)(ix) vi) for each function, determining whether the name is compliant with a verb and noun guide; and if the name is noncompliant with the verb and noun guide: if the function is not to be reanalyzed, deleting the function and continuing the analysis at step (a)(ix); and if the function is to be reanalyzed, returning to step (a)(i); vii) for each function, determining whether a proper pattern is being used; if the proper pattern is not being used: if the function is not to be reanalyzed, deleting the function and continuing the analysis at step (a)(ix); and if the function is to be reanalyzed, returning to step (a)(i); viii) for function, determining if there is a façade in which the function can be associated with and if there is a façade that can be associated with the function, associating the function with the façade for access by a user through the facade; and ix) storing the plurality of functions in a repository.

According to another embodiment of the present invention, a computer program product for dynamically offering upgraded services in a network comprising functions. The computer program product comprising: one or more computer-readable, tangible storage devices; a) program instructions, stored on at least one of the one or more storage devices, to apply a similar functionality analysis on the functions of a network; b) program instructions, stored on at least one of the one or more storage devices, to retrieve the plurality of functions stored by the similar functionality analysis from the repository, and create a pivot table; c) program instructions, stored on at least one of the one or more storage devices, to categorize the functions within the pivot table; d) program instructions, stored on at least one of the one or more storage devices, to filter the pivot table by a functional area of the pivot table; e) program instructions, stored on at least one of the one or more storage devices, to recreate the pivot table based on the functional area; and f) program instructions, stored on at least one of the one or more storage devices, to differentiate the exposable functions within the pivot table from non-exposable functions by attributes of the functions. Program instructions a) to apply a similar functionality analysis on the functions of a network further comprising: i) retrieve a plurality of candidate services from the network, each functions having a description, at least one attribute, and a name; ii) for each function, determine whether the name is the same or similar to a name of another function and if name is not the same or similar to any other function, continue with the analysis at step (a)(vi); iii) for each function, determine whether the description is the same or similar to a description of another function; and if the description of a function is not the same or similar to the description of another function, determine whether the name of the function correspond to a filter used in the network, if the name of the function corresponds to a filter used in the network, continue with the analysis at step (a)(viii); otherwise continue with the analysis at step (a)(vi); iv) determine whether there is a common name which can represent the plurality of functions being compared; if there is a common name which can represent the plurality of functions being compared, link each of the plurality of functions with the common name and continue with the analysis at step (a)(ix); v) for all functions which are not linked to a common name, continue with the analysis at step (a)(ix); vi) for each function, determine whether the name is compliant with a verb and noun guide; and if the name is noncompliant with the verb and noun guide: if the function is not to be reanalyzed, delete the function and continue the analysis at step (a)(ix); and if the function is to be reanalyzed, return to step (a)(i); vii) for each function, determine whether a proper pattern is being used; if the proper pattern is not being used: if the function is not to be reanalyzed, delete the function and continue the analysis at step (a)(ix); and if the function is to be reanalyzed, return to step (a)(i); viii) for function, determine if there is a façade in which the function can be associated with and if there is a façade that can be associated with the function, associate the function with the façade for access by a user through the facade; and ix) store the plurality of functions in a repository.

According to another embodiment of the present invention, a computer system for dynamically offering upgraded services in a network comprising functions. The computer system comprising: one or more processors, one or more computer-readable memories and one or more computer-readable, tangible storage devices; a) program instructions, stored on at least one of the one or more storage devices for execution by at least one of the one or more processors via at least one of the one or more memories, to apply a similar functionality analysis on the functions of a network; b) program instructions, stored on at least one of the one or more storage devices for execution by at least one of the one or more processors via at least one of the one or more memories, to retrieve the plurality of functions stored by the similar functionality analysis from the repository, and create a pivot table; c) program instructions, stored on at least one of the one or more storage devices for execution by at least one of the one or more processors via at least one of the one or more memories, to categorize the functions within the pivot table; d) program instructions, stored on at least one of the one or more storage devices for execution by at least one of the one or more processors via at least one of the one or more memories, to filter the pivot table by a functional area of the pivot table; e) program instructions, stored on at least one of the one or more storage devices for execution by at least one of the one or more processors via at least one of the one or more memories, to recreate the pivot table based on the functional area; and f) program instructions, stored on at least one of the one or more storage devices for execution by at least one of the one or more processors via at least one of the one or more memories, to differentiate the exposable functions within the pivot table from non-exposable functions by attributes of the functions. Computer program instructions of a) to apply a similar functionality analysis on the functions of a network comprising : i) retrieve a plurality of candidate services from the network, each functions having a description, at least one attribute, and a name; ii) for each function, determine whether the name is the same or similar to a name of another function and if name is not the same or similar to any other function, continue with the analysis at step (a)(vi); iii) for each function, determine whether the description is the same or similar to a description of another function; and if the description of a function is not the same or similar to the description of another function, determine whether the name of the function correspond to a filter used in the network, if the name of the function corresponds to a filter used in the network, continue with the analysis at step (a)(viii);

otherwise continue with the analysis at step (a)(vi); iv) determine whether there is a common name which can represent the plurality of functions being compared; if there is a common name which can represent the plurality of functions being compared, link each of the plurality of functions with the common name and continue with the analysis at step (a)(ix); v) for all functions which are not linked to a common name, continue with the analysis at step (a)(ix); vi) for each function, determine whether the name is compliant with a verb and noun guide; and if the name is noncompliant with the verb and noun guide: if the function is not to be reanalyzed, delete the function and continue the analysis at step (a)(ix); and if the function is to be reanalyzed, return to step (a)(i); vii) for each function, determine whether a proper pattern is being used; if the proper pattern is not being used: if the function is not to be reanalyzed, delete the function and continue the analysis at step (a)(ix); and if the function is to be reanalyzed, return to step (a)(i); viii) for function, determine if there is a façade in which the function can be associated with and if there is a façade that can be associated with the function, associate the function with the façade for access by a user through the facade; and ix) store the plurality of functions in a repository;

BRIEF DESCRIPTION OF THE SEVERAL VIEWS OF THE DRAWINGS

FIG. 13 shows an example of adding functions and candidate services in which actions were catalogued as added or accepted in the similar functionality analysis to a pivot table.

FIG. 15 shows an example of generating a pivot table by selecting functions or candidate services belonging to a particular functional area.

FIG. 18 shows an example of extracting all functions or candidate services that were catalogued as a technical operation.

DETAILED DESCRIPTION

Figure 1:
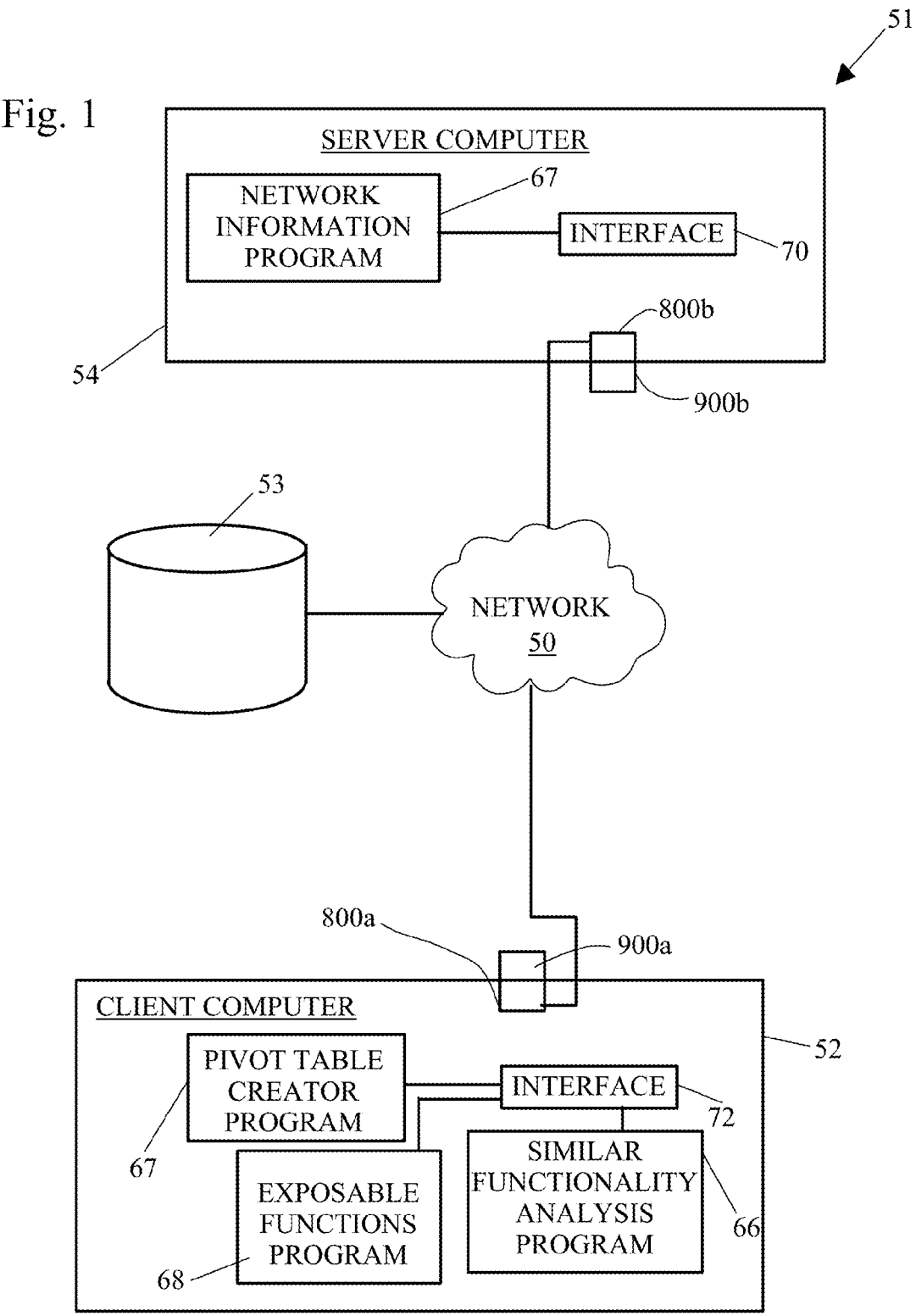
FIG. 1 depicts an exemplary diagram of a possible data processing environment in which illustrative embodiments may be implemented.
Figure 2:
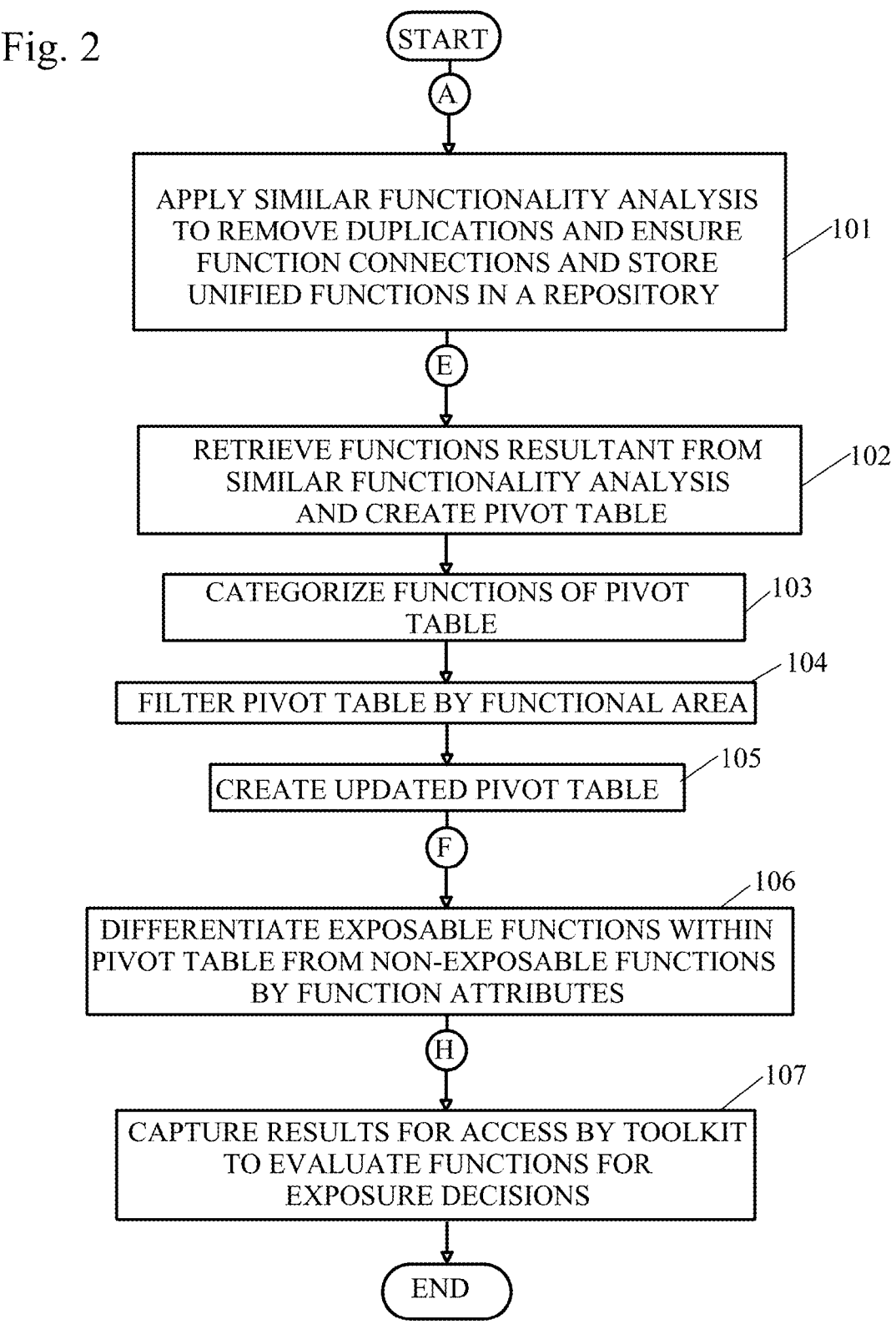
FIGS. 2-7 show a flowchart of a method of rationalizing functions to identify re-usable services.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a client computer 52, server computer 54, and a repository 53 connect to network 50. In other exemplary embodiments, network data processing system 51 may include additional client computers, storage devices, server computers, and other devices not shown. The client computer 52 includes a set of internal components 800a and a set of external components 900a, further illustrated in FIG. 24 The client computer 52 may be, for example, a mobile device, a cell phone, a personal digital assistant, a netbook, a laptop computer, a tablet computer, a desktop computer, a sequencing machine or any other type of computing device.

Client computer 52 may also contain an interface 72. The interface can be, for example, a command line interface, a graphical user interface (GUI), or a web user interface (WUI). The interface may be used, for example for viewing a pivot table, the similar function analysis, or the exposable functions or candidate services.

In the depicted example, server computer 54 provides information, such as boot files, operating system images, and applications to client computer 52. Server computer 54 can compute the information locally or extract the information from other computers on network 50. Server computer 54 includes a set of internal components 800b and a set of external components 900b illustrated in FIG. 24.

Figure 24:
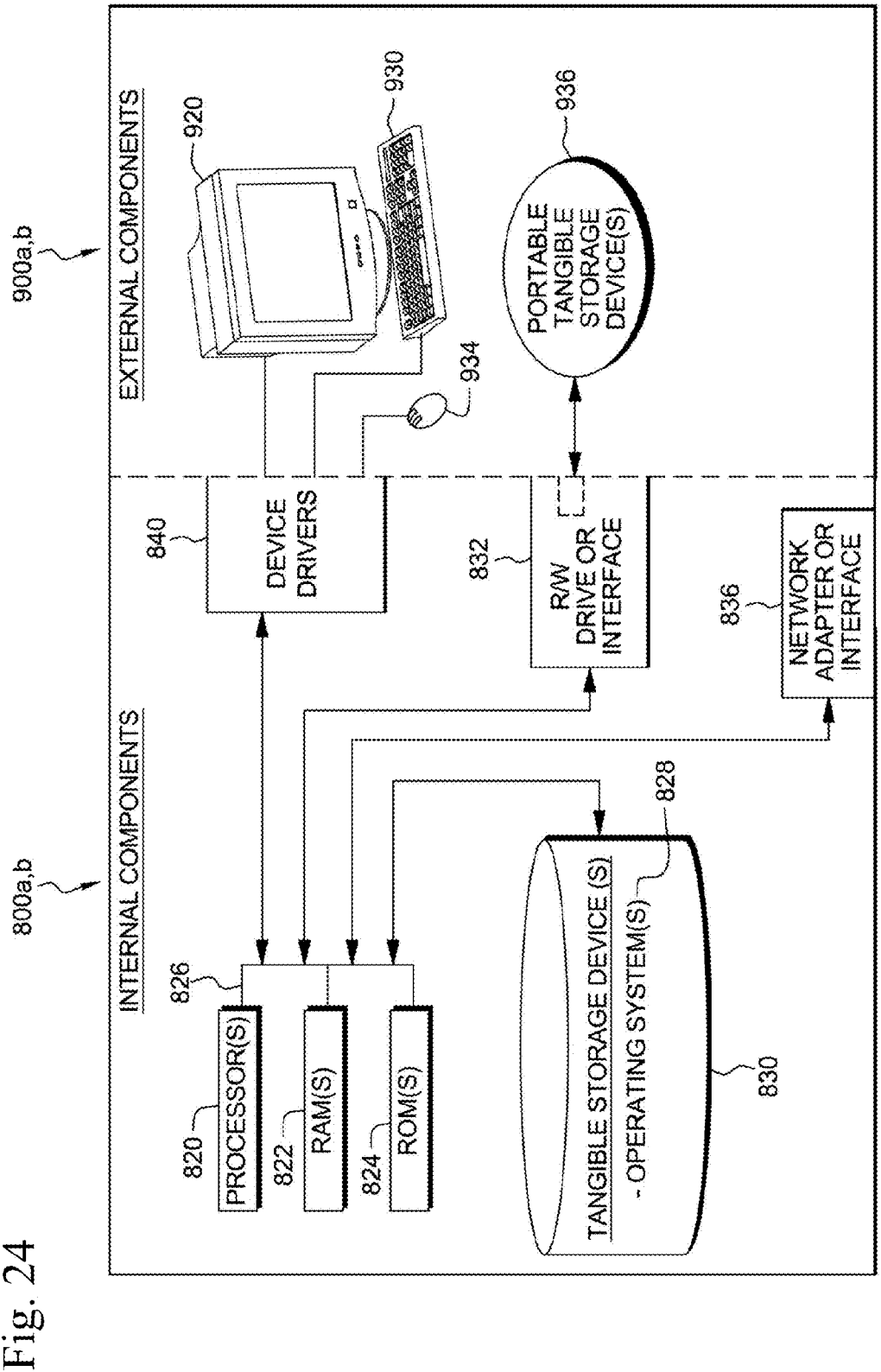
FIG. 24 illustrates internal and external components of a client computer and a server computer in which illustrative embodiments may be implemented.

Program code and programs such as a pivot table creator program 67, an exposable functions program 68, and/or a similar functionality analysis program 66 may be stored on at least one of one or more computer-readable tangible storage devices 830 shown in FIG. 24, on at least one of one or more portable computer-readable tangible storage devices 936 as shown in FIG. 24, or repository 53 connected to network 50, or downloaded to a data processing system or other device for use. For example, program code, a pivot table creator program 67, an exposable functions program 68, and/or a similar functionality analysis program 66 may be stored on at least one of one or more tangible storage devices 830 on server computer 54 and downloaded to client computer 52 over network 50 for use on client computer 52. Alternatively, server computer 54 can be a web server, and the program code and programs such as a pivot table creator program 67, an exposable functions program 68, and/or a similar functionality analysis program 66 may be stored on at least one of the one or more tangible storage devices 830 on server computer 54 and accessed on client computer 52. A pivot table creator program 67, an exposable functions program 68, and/or a similar functionality analysis program 66, can be accessed on client computer 52 through interface 72. In other exemplary embodiments, the program code, and programs such as a pivot table creator program 67, an exposable functions program 68, and/or a similar functionality analysis program 66 may be stored on at least one of one or more computer-readable tangible storage devices 830 on client computer 52 or distributed between two or more servers.

In the depicted example, network data processing system 51 is a combination of a number of computers and servers, with network 50 representing the Internet—a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

In an embodiment of the present invention, the method of rationalizing functions to identify re-usable services to filter functions or candidate services prior to the usage of service modeling toolkit can filter out 75 to 90 percent of the functions or candidate services for entry into the service modeling toolkit. To the reduced number of functions or candidate services, a service litmus test to identify services that need to be exposed across Lines of Business (LoB), across client enterprise and/or third party may be applied.

Candidate services are groups of functions that have been previously identified. Functions are potential candidate services. All functions or candidate services have at least a description, which helps to differentiate one function from the other. The function description preferably includes attributes such as a specific action and the object on which this action is performed.

The method of the present invention may be implemented through spreadsheet tools to minimize manual and time consuming effort, through paper; or through an Eclipse or Windows based tool. With implementation through an Eclipse or Windows based tool, an automated lexical analysis may be used to suggest duplication; re-use in different case scenarios, and calculating function or candidate service complexity. The automated lexical analysis may be carried out through the usage of string functions in C/C++ or Java platform to define a list of key words to perform custom lexical analysis or through the usage of lexical generators such as JavaCC, JFlex, JLex in the Java platform and Flex or Quex in the C/C++ platform. It should be noted that data mining may be used to determine similarities between function names and description, whether function names are compliant, using proper patterns, whether a function may be used a façade and whether functions should be classified as services, functions, or removed. The data mining may be carried out by a program, such as DB2 Intelligent Miner produced by International Business Machines Corporation. Data mining is the process of automatically searching large volumes of data for patterns. Data mining may be further defined as the nontrivial extraction of implicit, previously unknown, and potentially useful information from data. Data mining may use computational techniques from statistics, information theory, machine learning, and pattern recognition.

FIGS. 2-7 show a flowchart of a method of rationalizing functions to identify re-usable services. A similar functionality analysis is applied to functions of a service oriented architecture (SOA) to remove duplications, unify functions, and ensure function or candidate service connections, for example through the similar functionality analysis program 66.

The unified functions resultant from analysis are stored in a repository (step 101). The repository may be repository 53 shown in FIG. 1. Unified functions are functions that have been rationalized and combined based on their description, which indicates that the functions perform similar capabilities with only slight variations. The similar functionality analysis removes duplications and ensures function or candidate service connections by: identifying functions with similar names and identical functionality; identifying functions with similar names but different functionality to eliminate all duplication functions using function description as a basis; identifying functions with different names, but identical functionality to group functions with some variations in functionality, but with overlapping commonality under a course grained façade function; ensure function name and description for correctness by accepting, deleting, or fixing; and related functions to façades. Once the similar functionality analysis is complete, the analysis may include: the function/candidate name, function description; action resulting from analysis of accepted, added, deleted, or unified; the unified function name, and the façade for a course grained function that can be supported by finer grained functions, for example as shown in FIGS. 10-13. Step 101 is further described in FIGS. 3-5.

The functions resultant from the similar functionality analysis are retrieved from the repository and a pivot table is created with the unified functions (step 102), for example by the pivot table creator program 67. The functions within the pivot table are categorized (step 103). The categorization includes categorizing based on operation the function or candidate service performs through create, read, update, delete, technical functions, and wrongly placed (CRUDTW) operations, the functional area the candidate service or function should belong to and the business activity type. The categorization is preferably based on the function or candidate service description.

FIG. 13 shows an example of adding all functions or candidate services which actions are catalogued as "added" or "accepted" in a similar functional analysis (step 103). The pivot table allows each function to be catalogued as a CRUDTW operation, business type and function area to which it belongs. CRUDTW operations includes a create (C) operation, a read (R) operation, an update (U) operation, a delete (D) operation, a technical (T) operation, and a wrong (W) placed operation. In one embodiment, the pivot table includes function/candidate service name, CRUDTW operation; functional area business type activity; and function type. The function type includes functional (e.g. business function); information (e.g. information access/updates and functions that support business functions); and utility (e.g. technical functions such as send notification).

Figure 14:
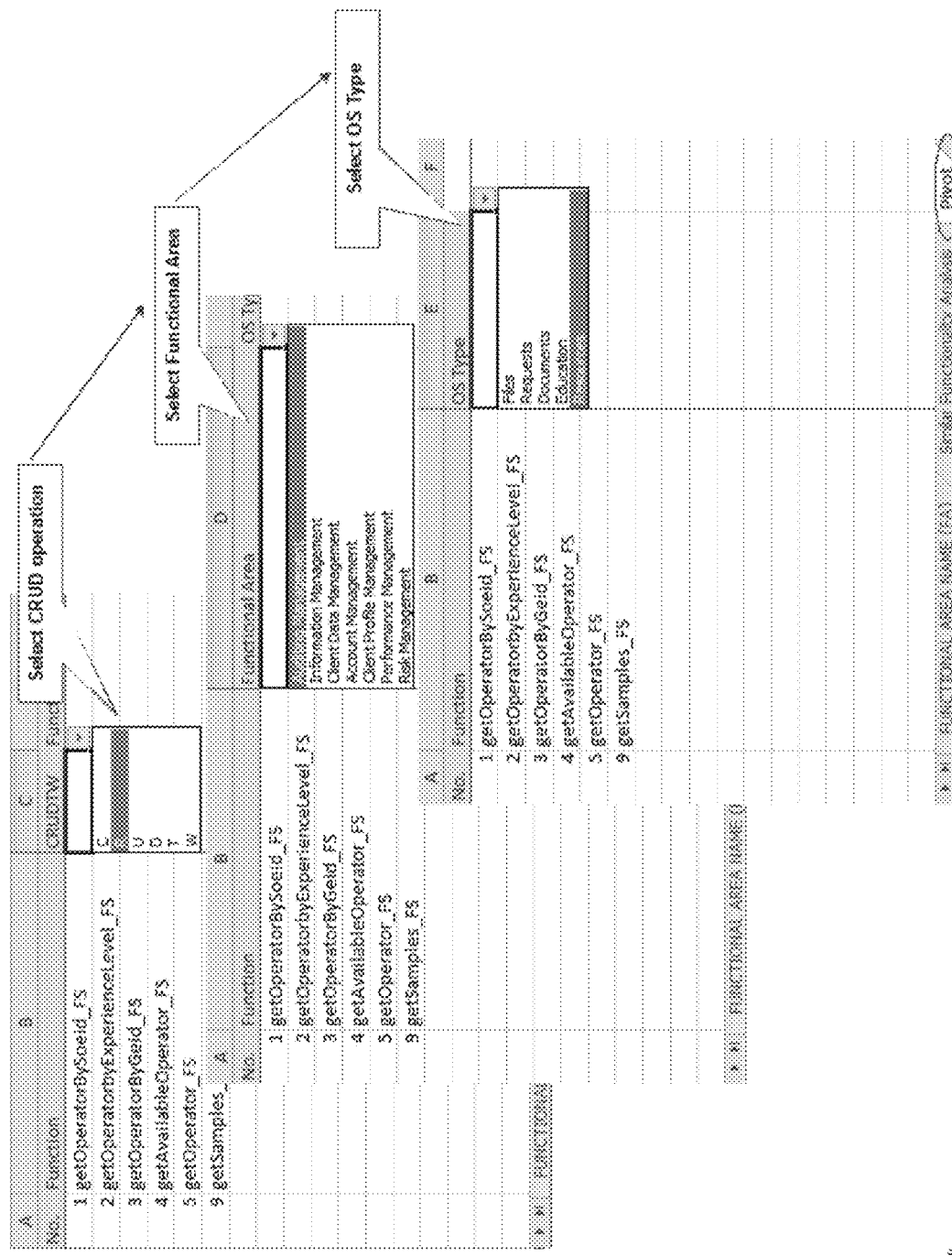
FIG. 14 shows an example of categorizing functions or candidate services being categorized within the pivot table.

FIG. 14 shows an example of functions or candidate services being categorized within a pivot table. Technical functions, such as "send notification" would be flagged as a "T" and any function that is wrongly placed in a functional area would be flagged as a "W" and moved to an appropriate functional area. Additionally, the activity type functions may also be categorized.

Figure 15:
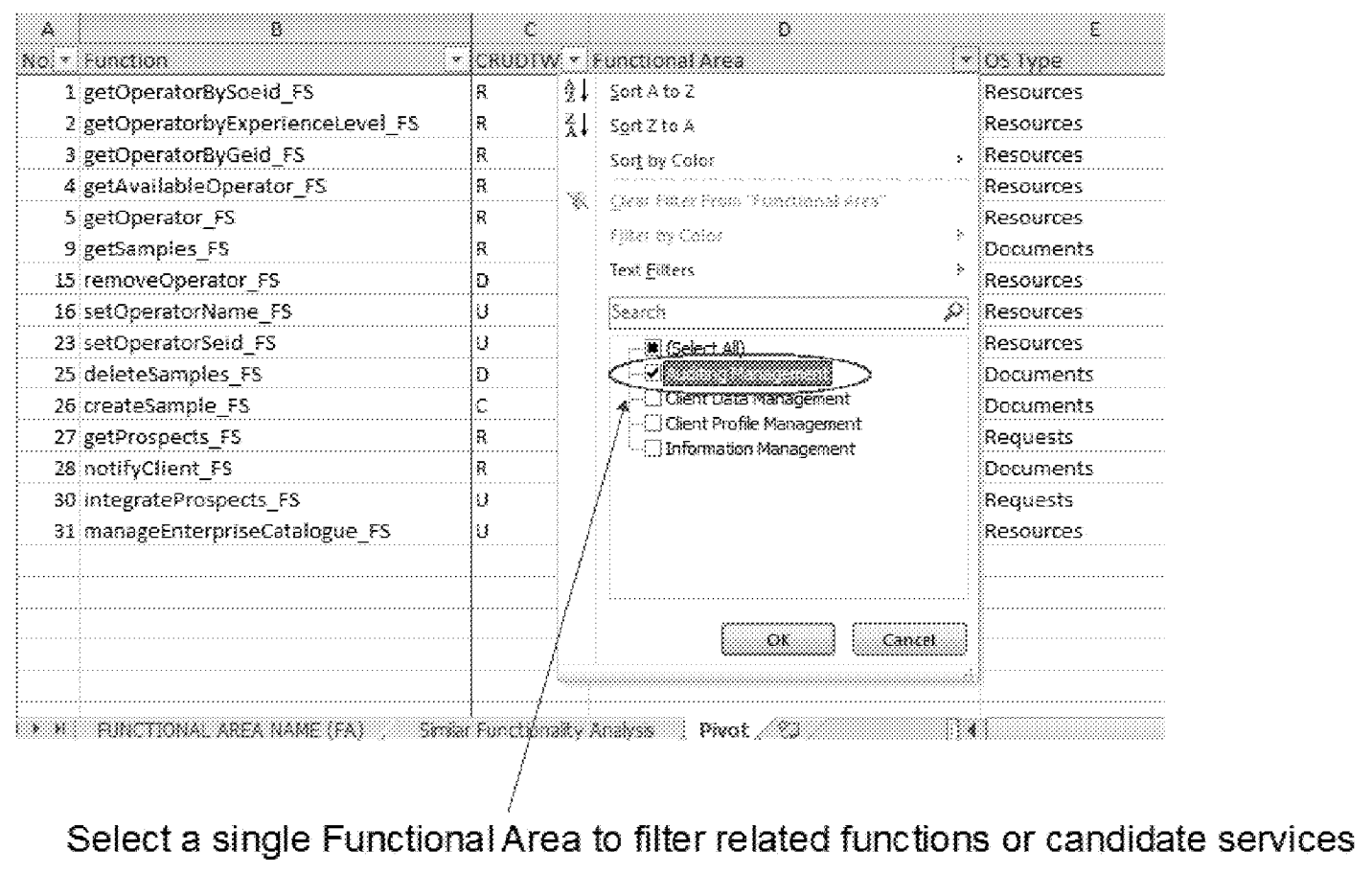

The pivot table is then filtered by functional area (step 104). FIG. 15 shows an example of generating a table by selecting functions or candidate services belonging to a particular functional area. In this example, the functional area filter is auditing management.

Figure 16:
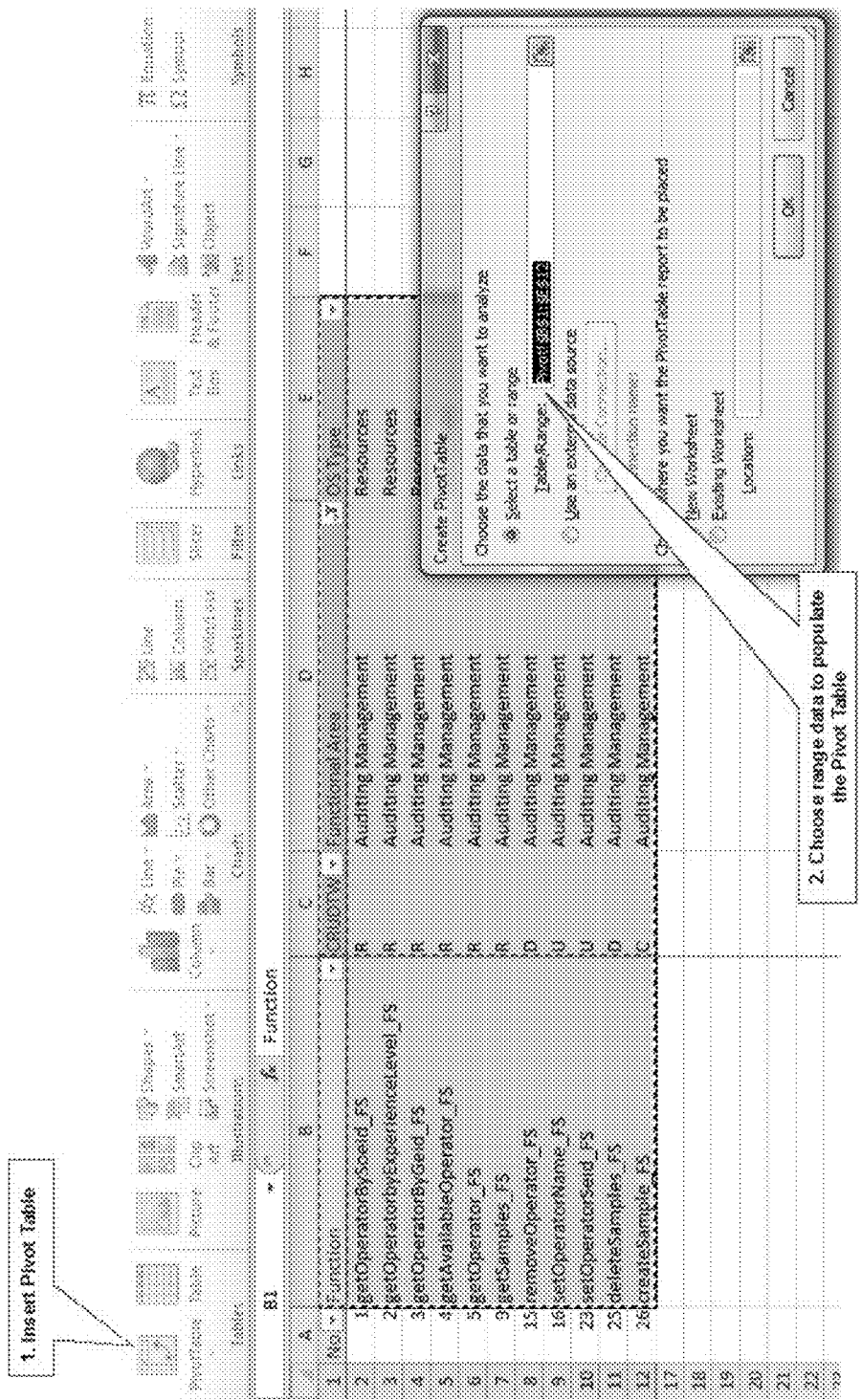
FIG. 16 shows an example of creating a pivot table.

An updated pivot table is then recreated based on functional area (step 105). FIG. 16 shows an example of selecting all rows for creating another or an updated pivot table. It should be noted that in most cases, functions catalogued as Information Services will be filtered since they are not considered to be exposable in most projects and were filtered out when the generating and filtering by the functional area.

Figure 17:
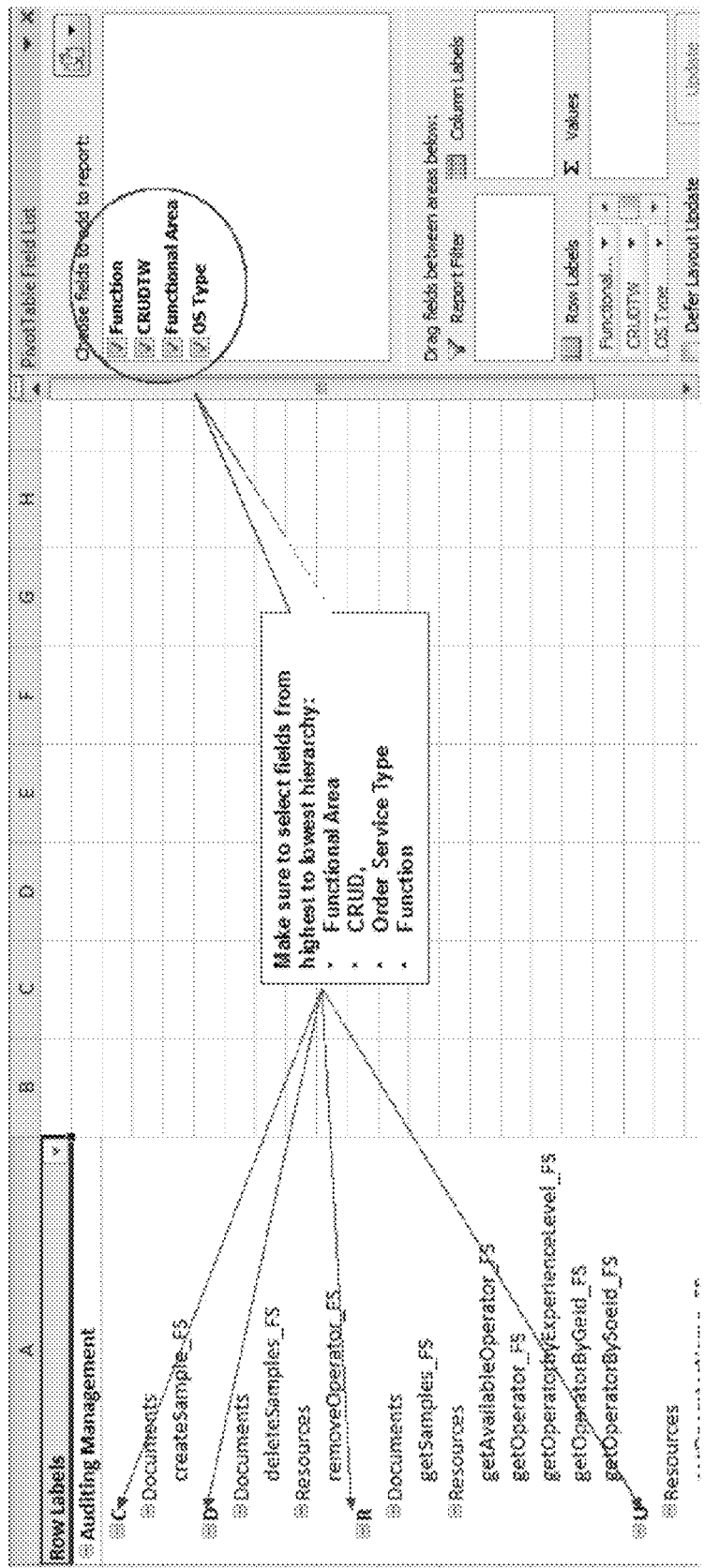
FIG. 17 shows an example of selecting hierarchy within the pivot table.
Figure 19:
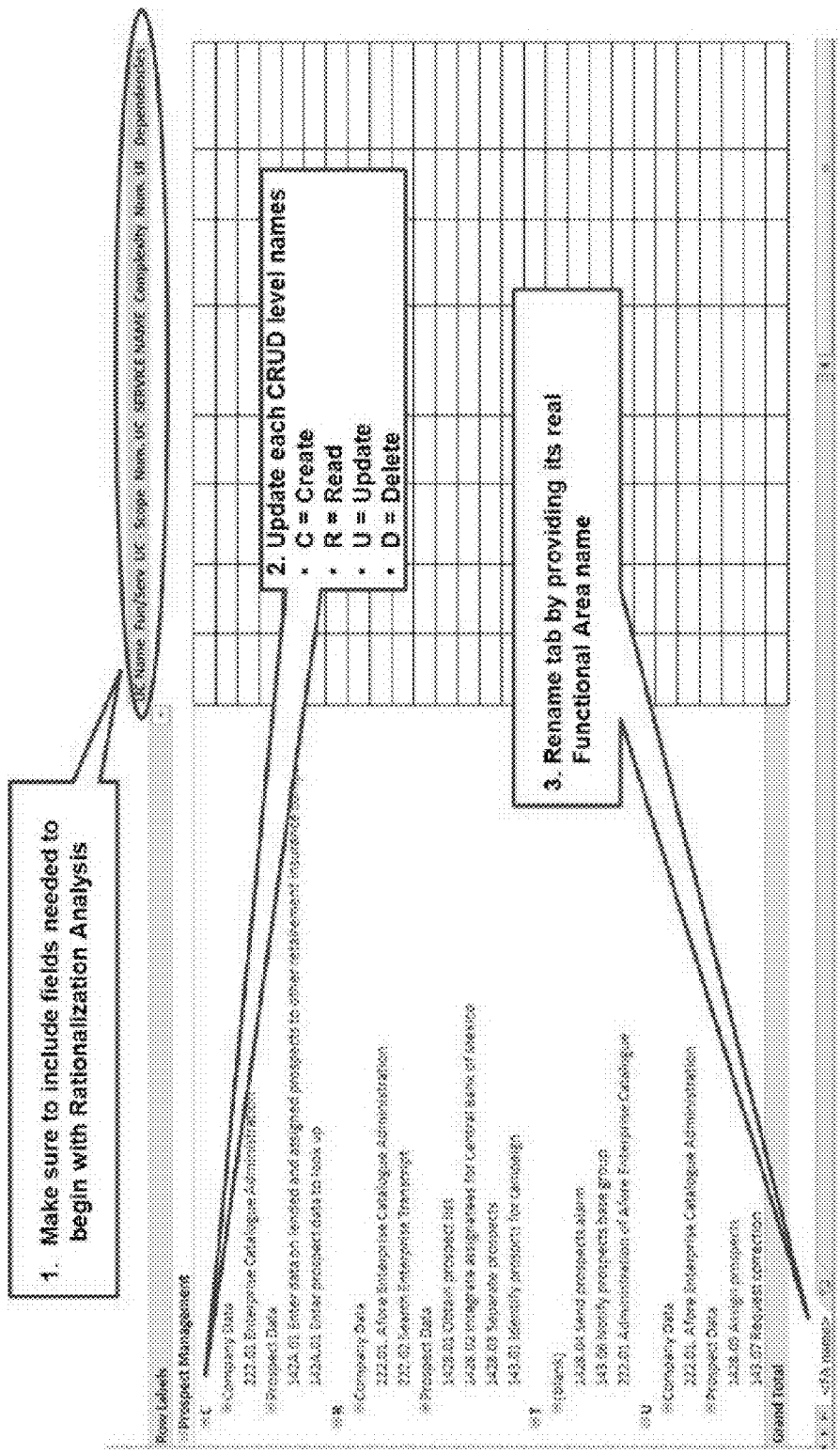
FIG. 19 shows an example of filling all functions or candidate service attributes and using function attributes to identify and differentiate exposable functions from non-exposable functions.

The exposable functions or candidate services are then differentiated from non-exposable functions or candidate services by function attributes (step 106) through functional area rationalization, for example by the exposable functions program 68. Exposable functions or candidate services are those which have more than one consumer and need to have standardized way of being invoked i.e. require standardized interface. Exposable functions are determined through functional area rationalization as discussed relative to FIGS. 20, 21 and 22. The functional area rationalization includes identification of use cases related to the function, identification of function re-use across different use scenarios, determination of complexity level based on the number of user interfaces to determine effort required to implement these candidate services or functions. More specifically, the functional area rationalization includes information from the pivot table, the use case name associated with the function, the analysis linked to the function, the function/service analysis results, use case scope within a project, the number of cases related to the function for re-use identification, service name to be used in litmus test for service exposure decisions, identified pattern to follow function for identifying level of granularity; complexity of function to qualify initial implementation effort; number of user interfaces linked to the function for re-use identification and dependencies. To use the recreated pivot table, the pivot table is preferably organized by order of importance. In one embodiment, the selected order of importance is Functional Area, CRUDTW, Business Type, and Function, for example as shown in FIGS. 17 and 19. The fields selected are selected in order from highest to lowest in importance. Step 106 is further described in FIGS. 6-7.

Figure 23:
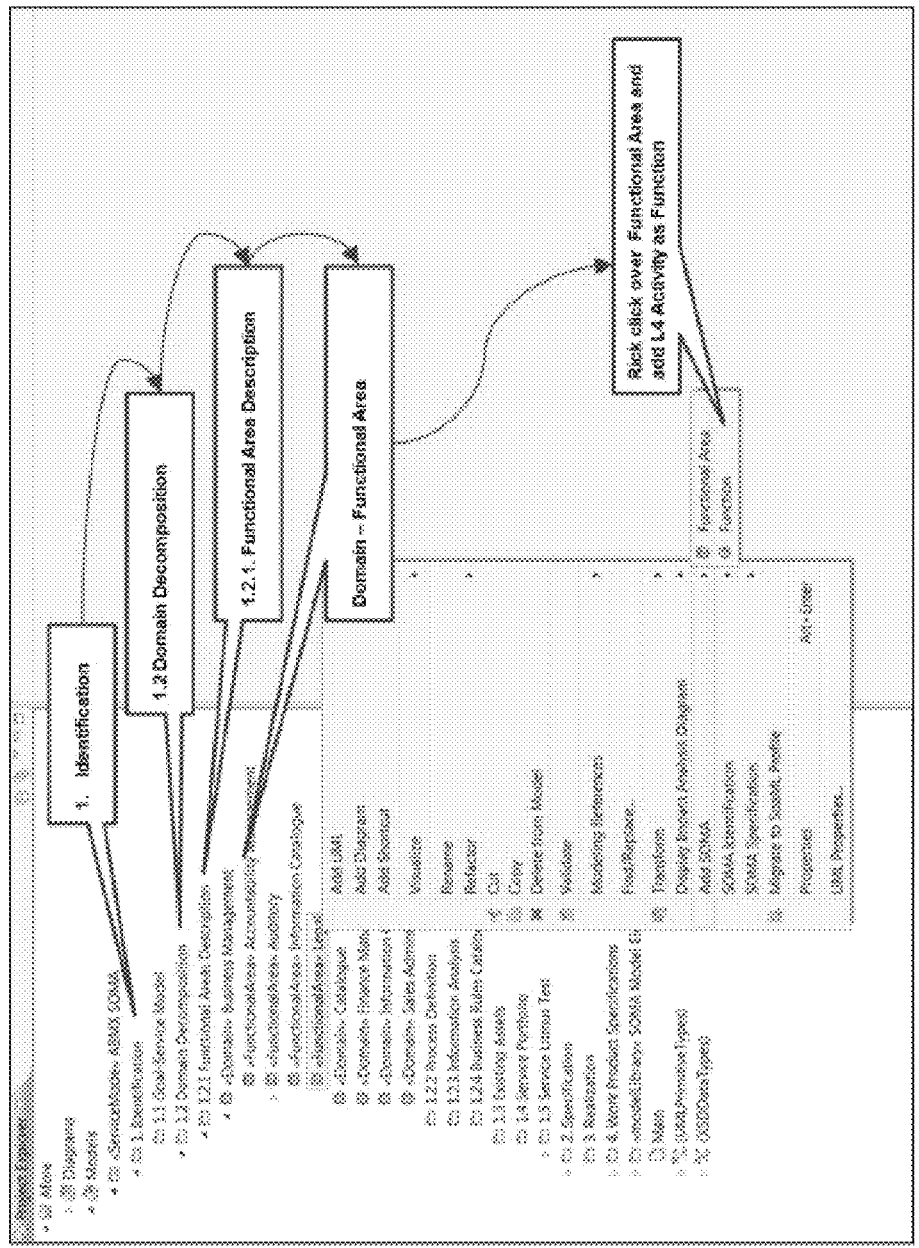
FIG. 23 shows an example of capture results in a toolkit for evaluation of candidate services for exposure decisions.

The results of the differentiation of exposable function services through functional area rationalization are captured for access by a service modeling toolkit to evaluate candidate service for exposure decisions (step 107) such as IBM's SOMA-ME-Service Oriented Modeling Architecture Modeling Environment. FIG. 23 shows an example of the captured results in an SOMA-Me toolkit to evaluate candidate service for exposure decisions.

Figure 3:
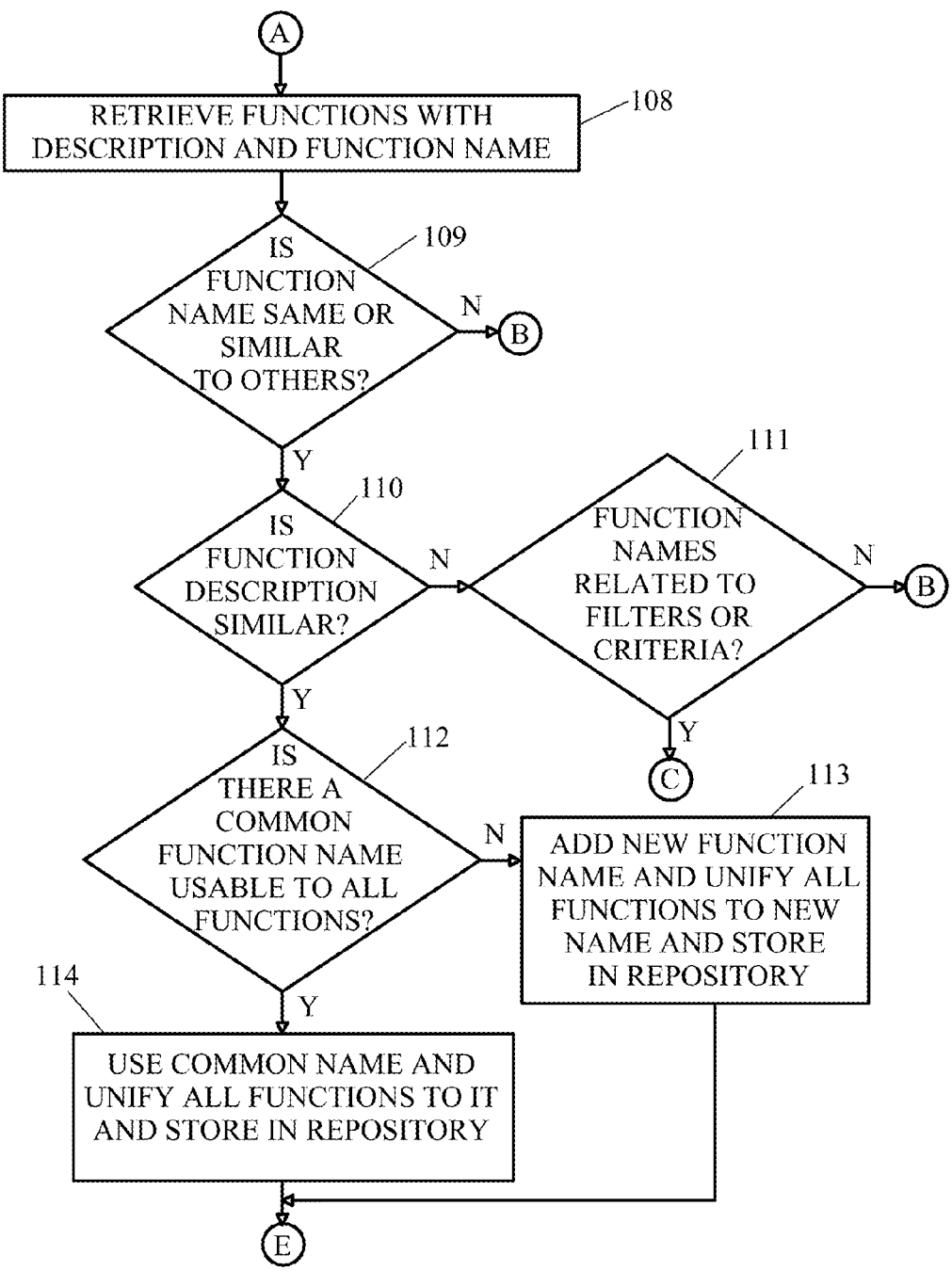
Figure 4:
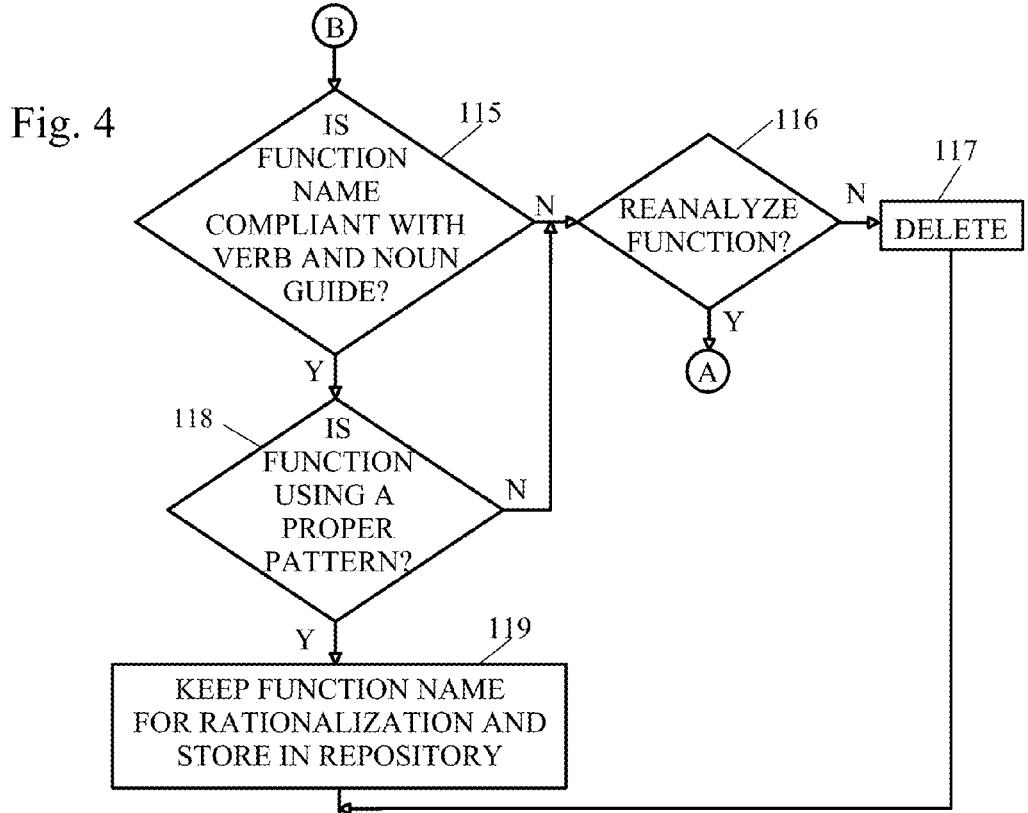
Figure 5:
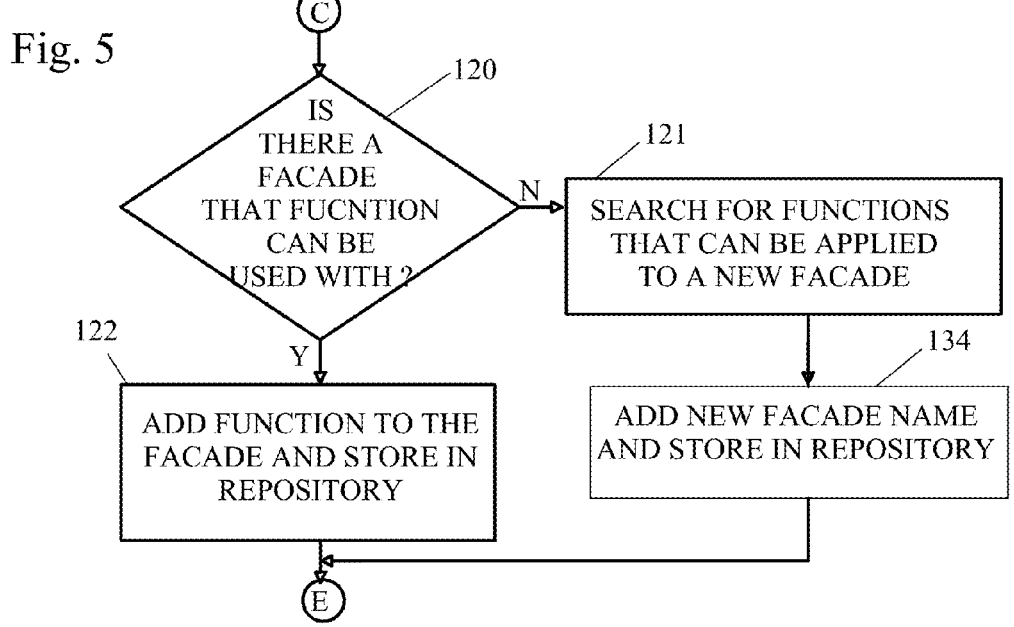

FIGS. 3-5 show increased detail of step 102 of FIG. 1 of applying a similar functionality analysis to functions to remove duplication and ensure function connections.

Figure 8:
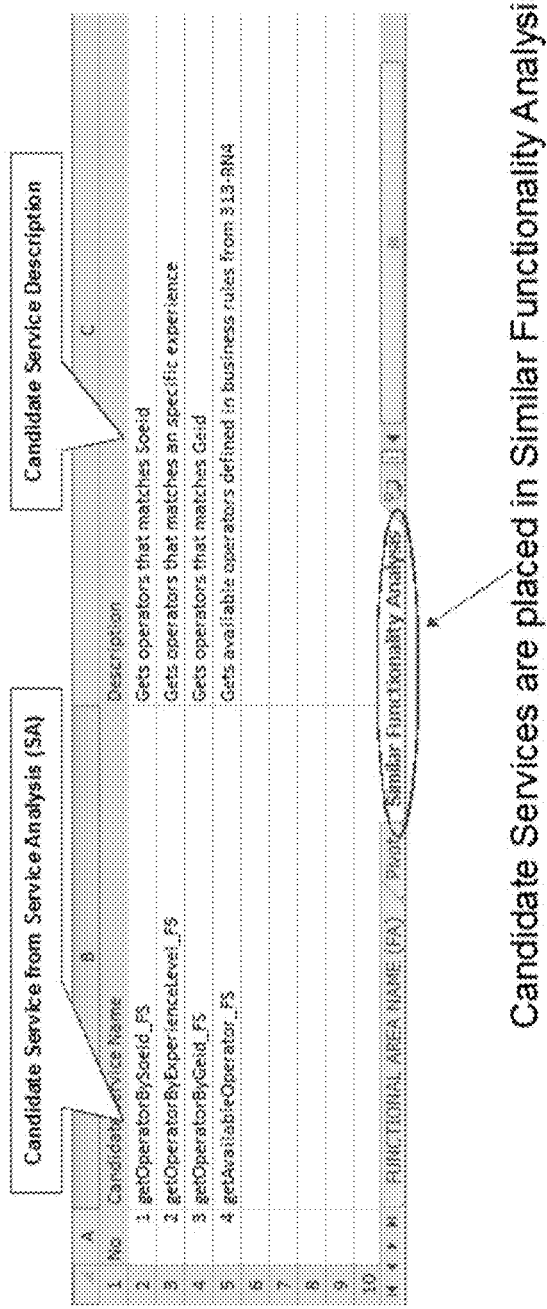
FIG. 8 shows an example of capturing all functions or candidate services and placing the functions or candidate services in a similar functionality analysis section within a toolkit.
Figure 9:
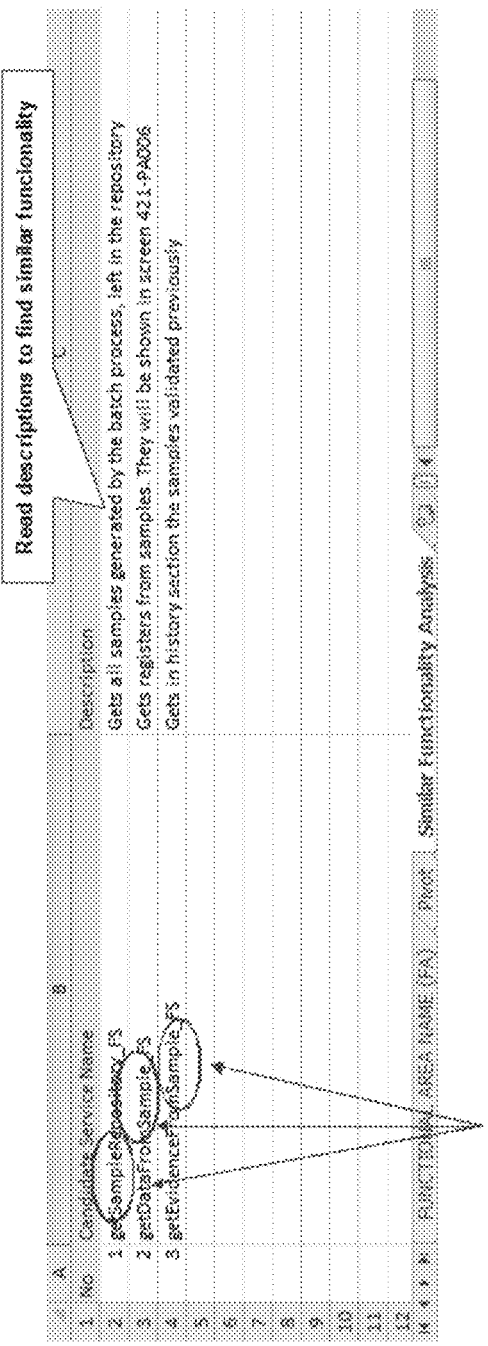
FIG. 9 shows an example of unifying functions or candidate services by looking for similar or synonymous verbs/nouns and descriptions to identify duplicates.

Referring to FIG. 3, candidate services or functions including function name and description are retrieved (step 108), for example from a repository, such as repository 53 shown in FIG. 1 by the similar functionality analysis program 66. An example of candidate services or functions resultant from a similar functionality analysis and functions descriptions received by similar functionality analysis are shown in FIG. 8. If the function name of a function is the same or similar the function name of another function (step 109), determine if the functional description of the function is similar to the functional description of another function (step 110). FIG. 9 shows an example of unifying functions or candidate services by looking for similar or synonymous verbs/nouns and descriptions to identify duplicates.

If the functional description of a function is similar to the functional description of another function (step 110), combine the function under a common function name usable to represent the functions under consideration (step 112), and unify all functions to the common name and store the common name and function descriptions in a repository (step 114), for example repository 53 shown in FIG. 1 and continue to step 103 of retrieving functions resultant from the similar functionality analysis and create a pivot table.

Figure 10:
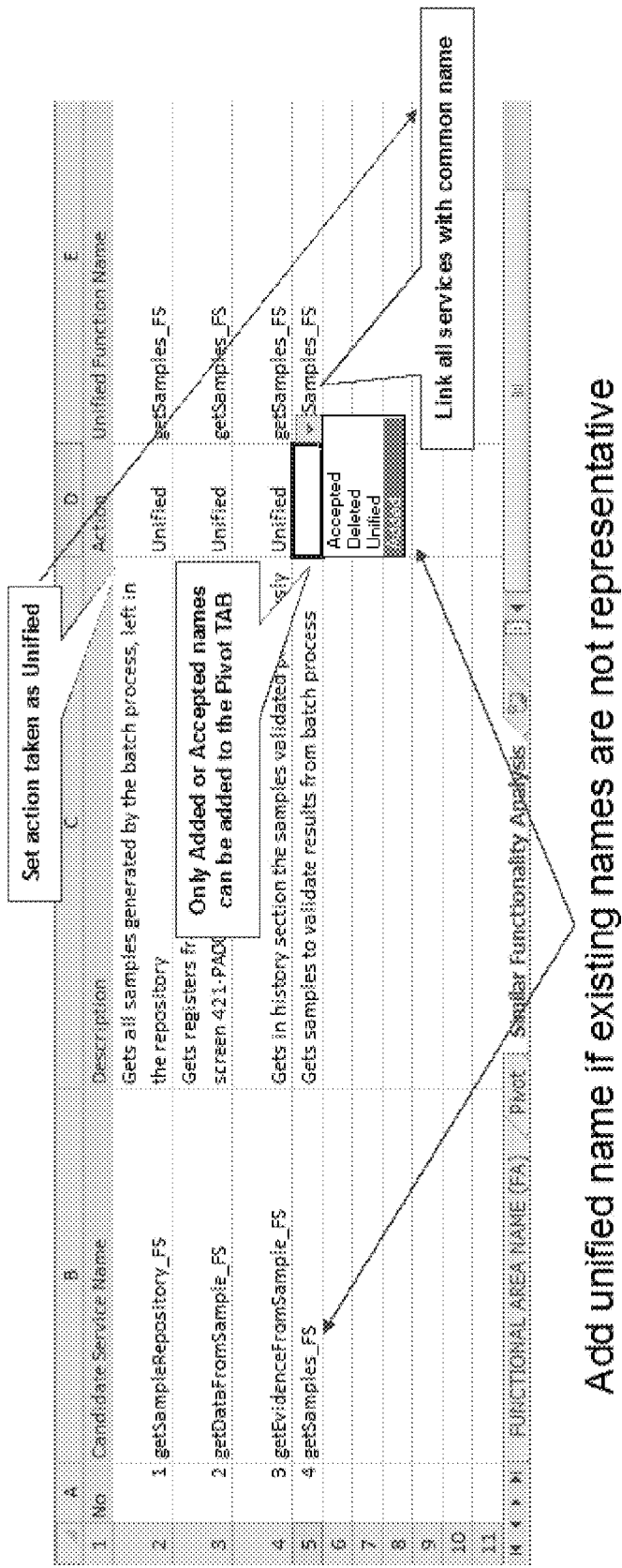
FIG. 10 shows an example of identifying is a common function name is usable to all functions and if not, adding a new function name to unify all of the functions if an existing name is not representative.

If there is not a common function name usable to all functions under consideration (step 112), add a new function name and unify all functions to the new name and store in a repository (step 113) and return to step 103 (see FIG. 2) of retrieving functions resultant from the similar functionality analysis and create a pivot table. FIG. 10 shows an example of selecting a single function and if none of the existing names are applicable, adding a new name and relating all the functions to it.

Figure 11:
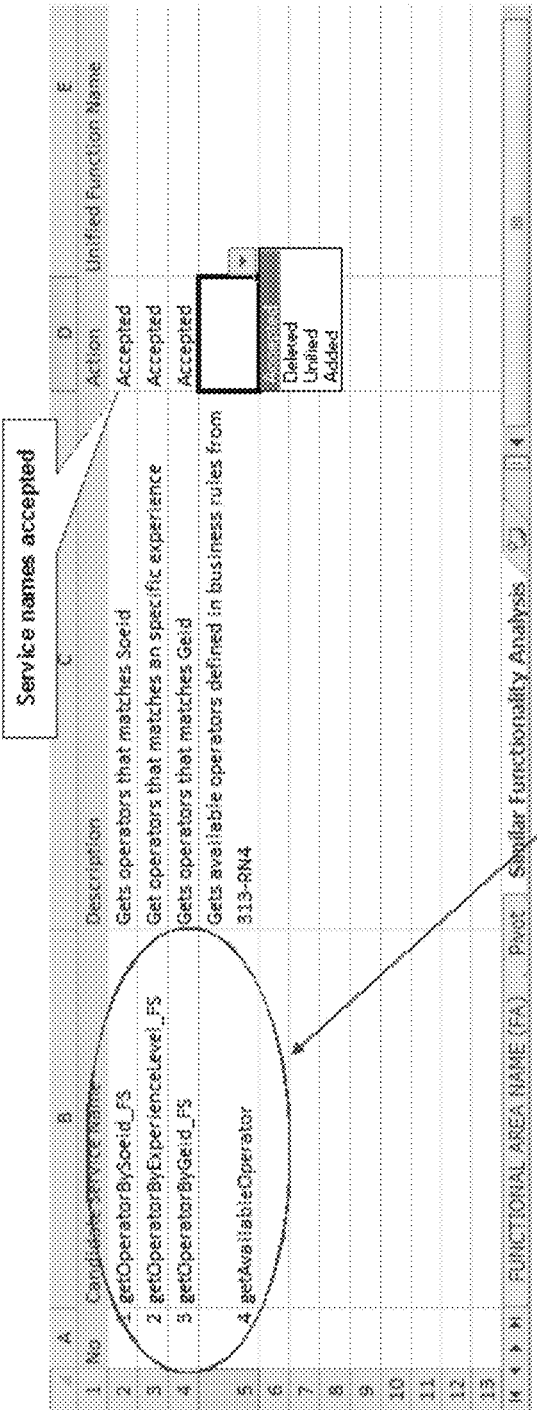
FIG. 11 shows an example of functions that appear similar, but should not be unified or deleted.

If the function name of a function or a candidate service is not the same or similar to the function name of another function or candidate service (step 109), continue to step 115 of FIG. 4 and determine if the function name is compliant with a verb and noun guide (step 115). If the function name is compliant with a verb and noun guide (step 115), and the function is using a proper pattern (step 118), keep the function name for rationalization and store in a repository, for example repository 53 shown in FIG. 1. FIG. 11 shows an example of functions that appear similar, but must not be unified nor deleted. If those functions are not synonymous and they describe different actions, then they must be considered and accepted.

If the function name is noncompliant with a verb and noun guide (step 115), and the function is not to be reanalyzed (step 116), delete the function (step 117) and return to step 103 (see FIG. 2) of retrieving functions resultant from the similar functionality analysis and create a pivot table.

If the function name is compliant with a verb and noun guide (step 115), and the function is not using a proper pattern (step 118), and the function is not to be reanalyzed (step 116), delete the function (step 117) and return to step 103 (see FIG. 2) of retrieving functions resultant from the similar functionality analysis and create a pivot table.

If the function name is noncompliant with the verb and noun guide (step 115), and the function is to be reanalyzed (step 118), return to step 108 of retrieving the functions with description and function name of FIG. 3.

Referring back to FIG. 3, if the function name of a function is the same or similar to other candidate services (step 109), and the function description of the functions (step 110) is not similar, and it is determined that the function names are not related to filters or other criteria (step 111), proceed to step 115 of whether the function name is compliant with a verb and noun guide of FIG. 4. The filters or criteria are defined as when related functions present the same functionality as another function with differences in how the functionality is performed. Theses filters or criteria may be preset or determined prior to analysis. For example obtaining an operator by name or by experience level as shown in FIG. 11. Therefore, filters are used to get information in different ways.

If the functions names are related to filters or other criteria (step 111) proceed to step 120 of FIG. 5. If there is a façade in which a function can be placed (step 120), add the function name to the façade to relate the functions under a generic term or façade (step 122) and return to step 103 (see FIG. 2) of retrieving functions and functions resultant from the similar functionality analysis and create a pivot table. Functions with common capabilities and slight variations are combined/unified and are invoked through a facade. Therefore, facades are containers of related functions that have been grouped together and will ultimately become real services. Consumers can send a request to the facade which will invoke the required function(s) as needed based on the input from the requestor.

Figure 12:
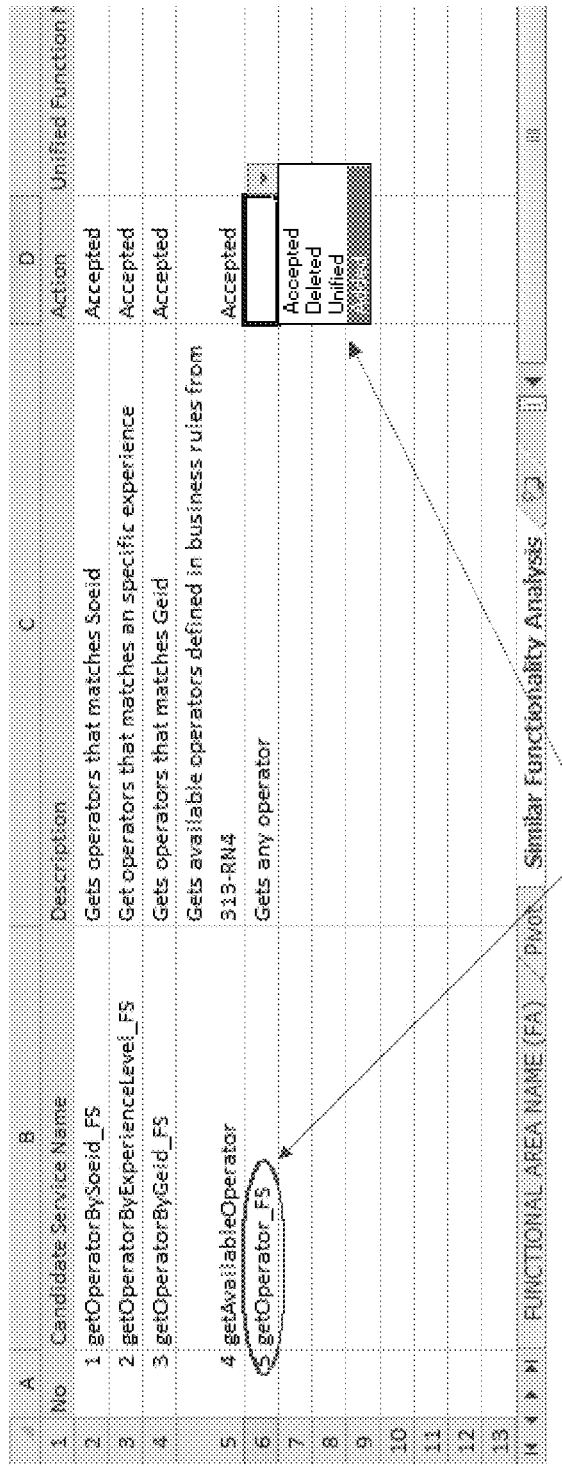
FIG. 12 shows an example of adding façade name that serves as a single point of access to more granular function and relating similar functions which are variations of the same facade.

If there is not a facade in which the function name can be placed (step 120), determine if sufficient other functions (134) and create a façade to group the functions together and store in a repository (step 121) and return to step 103 (see FIG. 2) of retrieving functions resultant from the similar functionality analysis and create a pivot table. FIG. 12 shows an example of adding a façade name that serves as a single point of access to more granular function and relating similar functions which are variations to the same façade.

Figure 20:
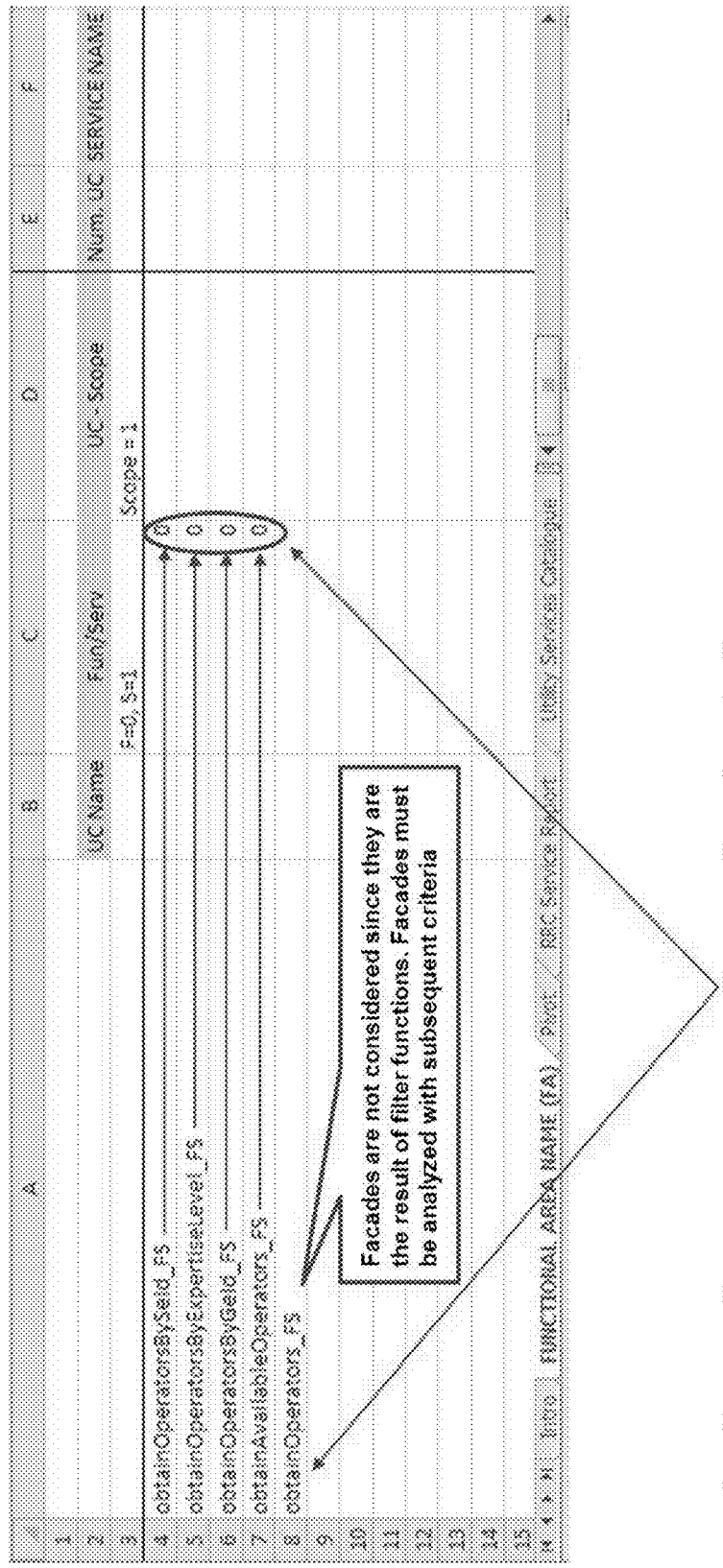
FIG. 20 shows an example of using function attributes to identify and differentiate exposable candidate services from functions to identify and differentiate exposable functions from non-exposable functions.

FIG. 20 shows an example of using function attributes to identify and differentiate exposable functions from non-exposable functions. For example, a façade function must not be analyzed.

Figure 6:
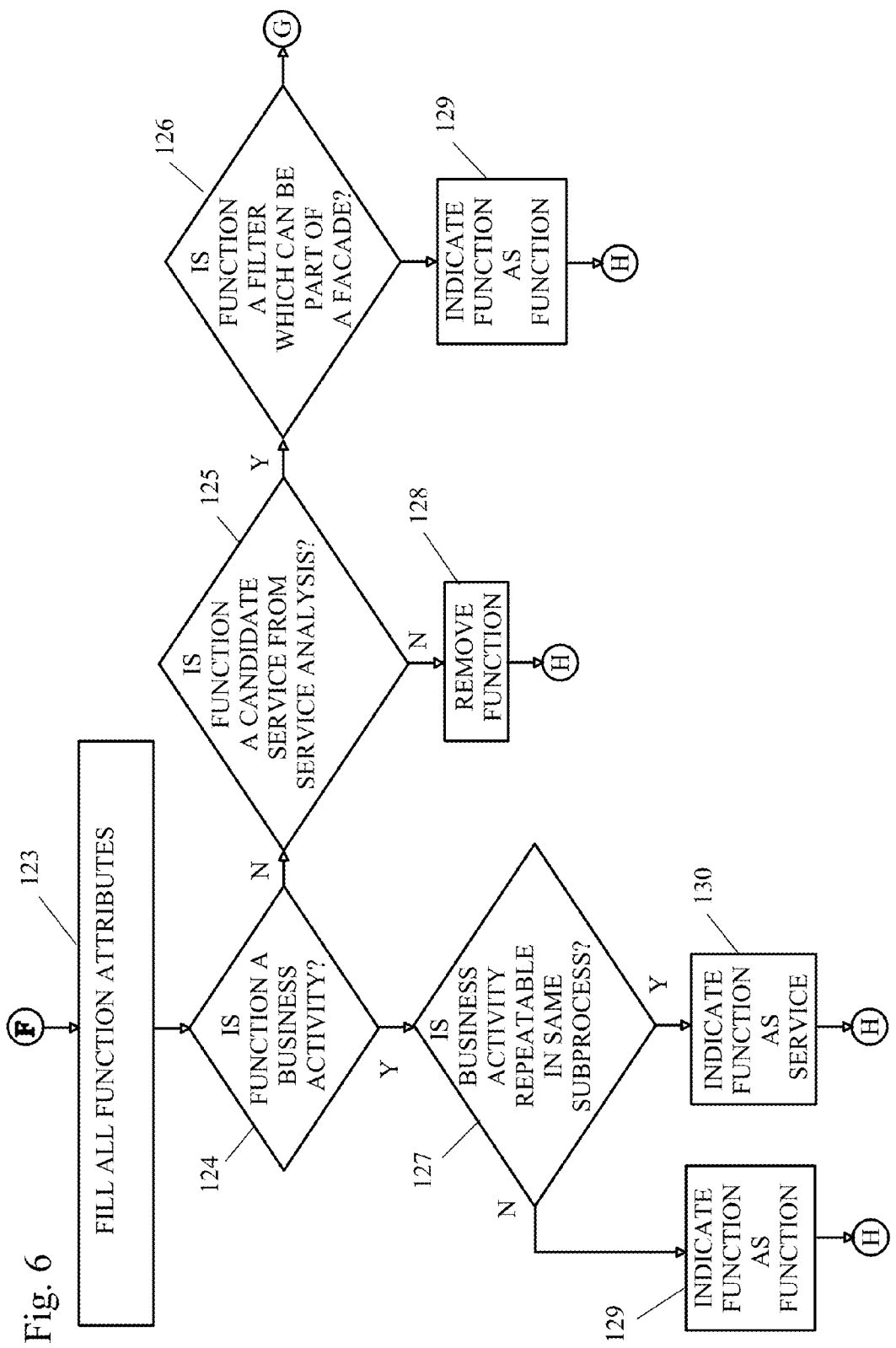
Figure 7:
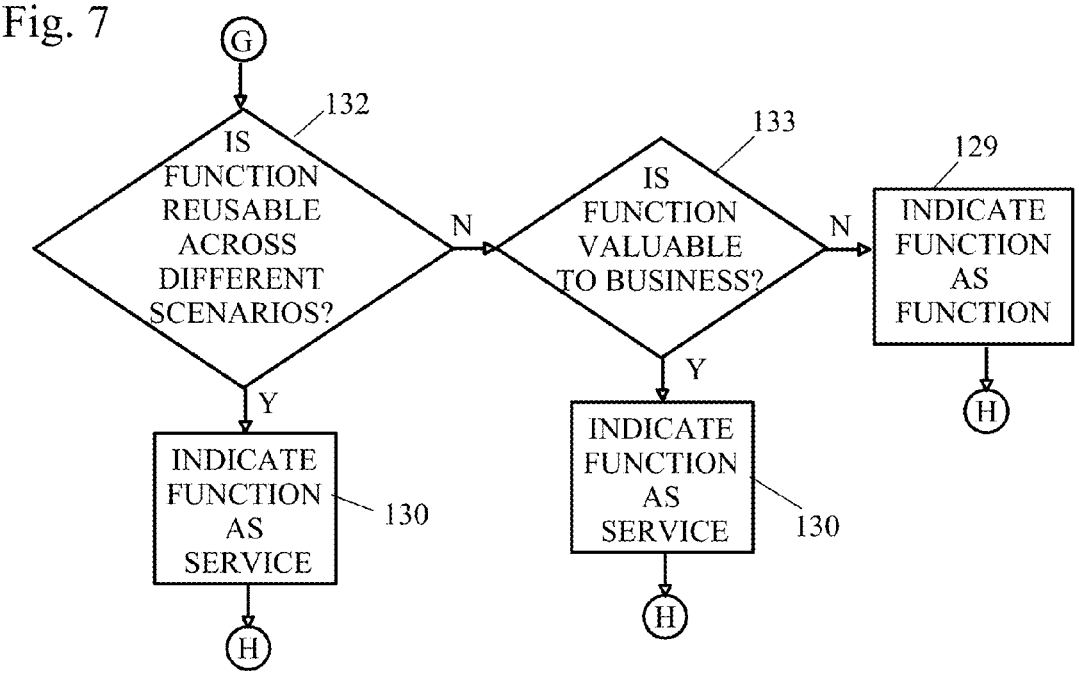
Figure 18:
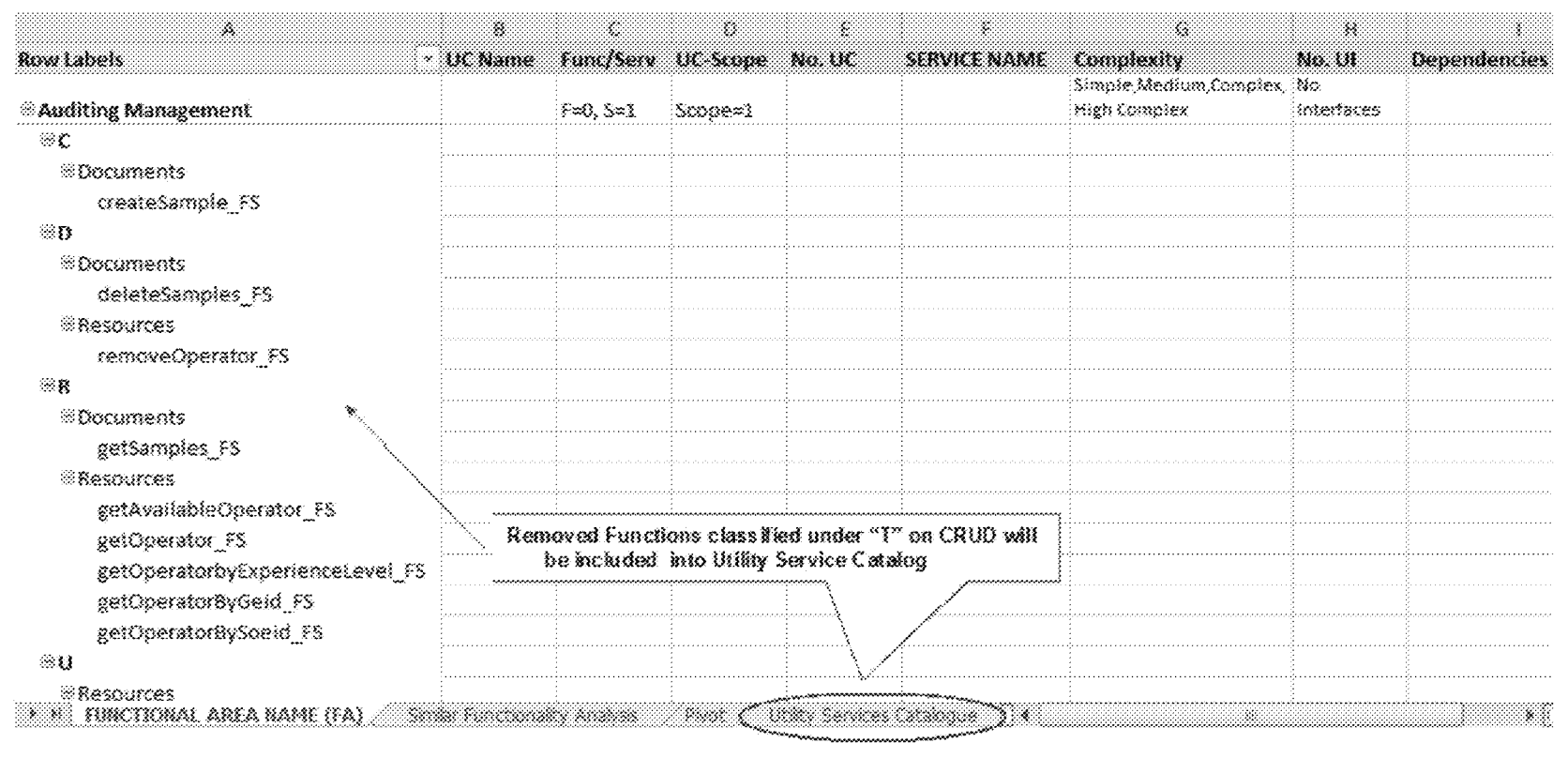

FIGS. 6-7 show increased detail of step 106 of FIG. 1 of differentiating exposable functions from non-exposable functions by function attributes through a functional area rationalization, for example by the exposable functions program 68. The differentiation of exposable functions from non-exposable functions by function attributes removes functions that are identified as a utility service, e.g. send e-mail notification, authentication, auditing, etc . . . ) since these functions will not be exposed as services or functions. FIG. 18 shows an example of removing functions or candidate services that were catalogued as technical operation or as a utility. The functions that are removed may be moved to a utility section and further classified.

Referring to FIG. 6, all function attributes are filled (step 123). FIG. 19 shows an example of filling all function attributes.

If the function is a business activity (step 124), and it is determined that the business activity is repeatable in the same sub-process (step 127), indicate the function as a service (step 130) and proceed to step 107 of capturing results for access by a service modeling toolkit to evaluate functions for exposure decisions. For example, "getOperator" shown in FIGS. 8-22 is repeatable task in a business process that occurs when auditing a user that processes different client requests, such as updating client data and account movements.

If it is determined that the business activity is non repeatable in the same sub-process (step 127), indicate the function as a function (step 129) and proceed to step 107 of capturing results for access by a service modeling toolkit to evaluate functions for exposure decisions.

If the function is not a business activity (step 124) and it is determined that the function is not a function from similar functionality analysis and the pivot table (step 125), the function is removed (step 128) as shown in FIGS. 17-18 and proceed to step 107 of capturing results for access by a service modeling toolkit to evaluate function for exposure decisions. If it is determined that the function is a function from similar functionality (step 125) and the function is a filter which can be part of a facade, indicate the function as a function and proceed to step 107 of capturing results for access by a service modeling toolkit to evaluate functions for exposure decisions. If it is determined that the function is not a filter which can be part of a facade (step 126), proceed step 132 of determining whether a function is reusable across different scenarios shown in FIG. 7.

Figure 21:
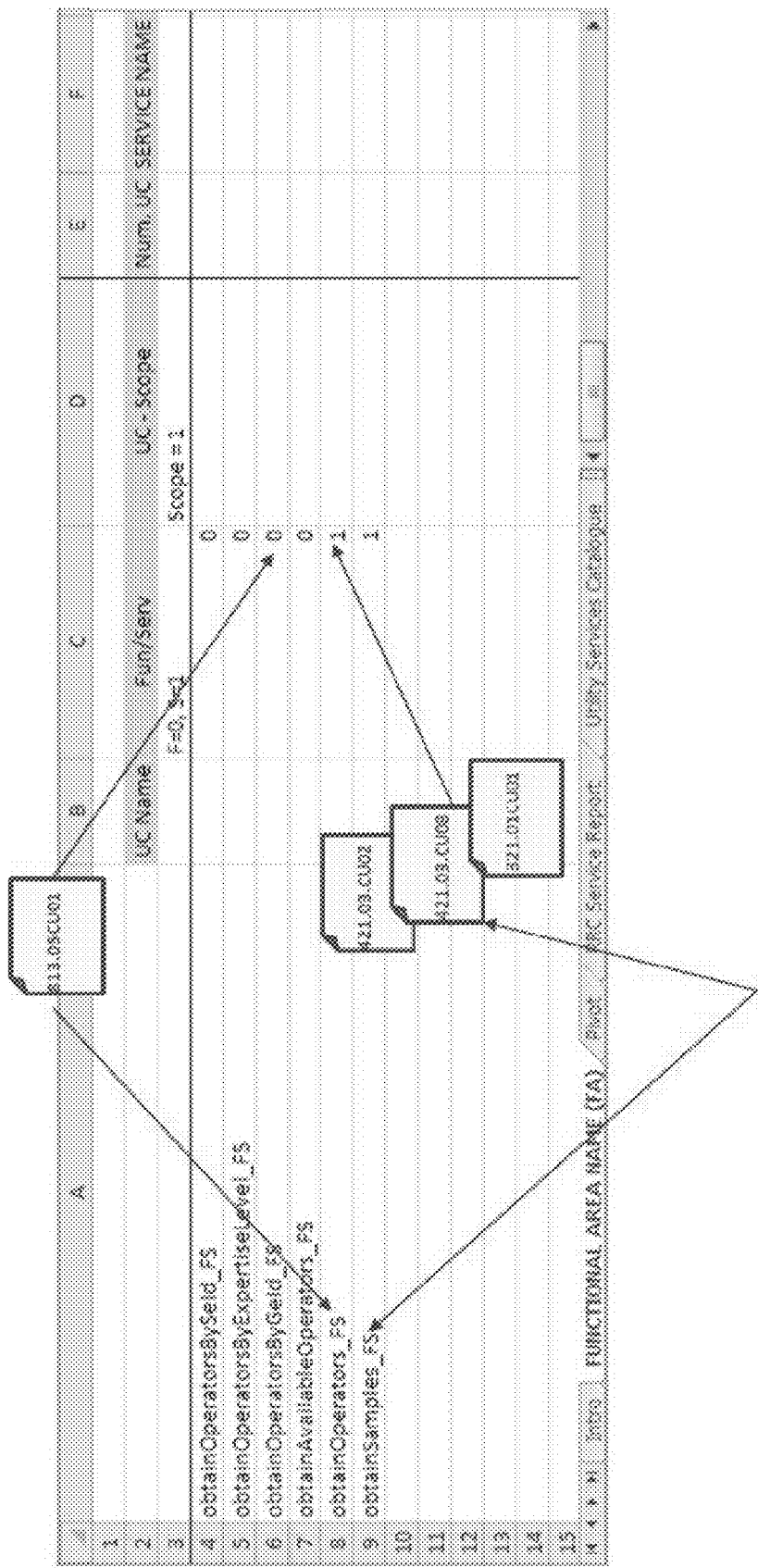
FIG. 21 shows an example of determining whether a function is used in or is reusable in more than one scenario to identify and differentiate exposable functions from non-exposable functions.

Referring to FIG. 7, if the function is reusable across different scenarios (step 132), indicate the function is a service (step 130) and proceed to step 107 of capturing results for access by a service modeling toolkit to evaluate function for exposure decisions. For example, as shown in FIG. 21, "calculateTaxes" is a unique task in a business process that happens in a single event per year, although not repeatable in more business scenarios, it is important to the business due to law requirements from government and business results, as result this functions is selected as candidate service.

Figure 22:
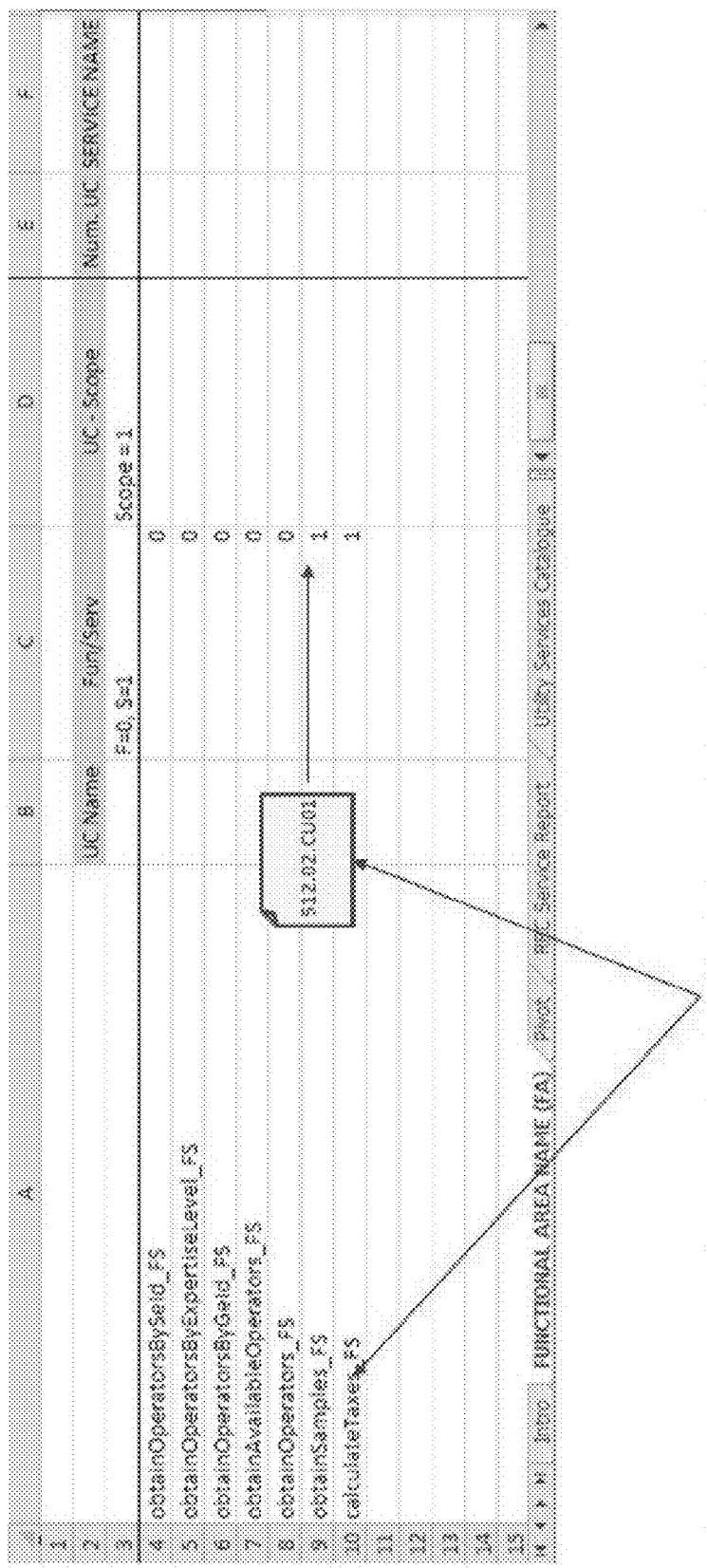
FIG. 22 shows an example of identifying whether a function which is not reusable is considered valuable to business to identify and differentiate exposable functions from non-exposable functions.

If the function is not reusable across different scenarios (step 132), determine whether the function is valuable to business (step 133). FIG. 22 shows an example of identifying functions that are reusable across different scenarios as candidate services.

If the function is valuable to business (step 133), indicate the function as a service (step 130) and proceed to step 107 of capturing results for access by a service modeling toolkit to evaluate functions for exposure decisions. If the function is not valuable to business (step 133), indicate the function as a function (step 129) and proceed to step 107 of capturing results for access by a service modeling toolkit to evaluate candidate service for exposure decisions. FIG. 22 shows an example of identifying whether a function which is not reusable but is considered valuable and indicating that it is a candidate service.

FIG. 24 illustrates internal and external components of client computer 52 and server computer 54 in which illustrative embodiments may be implemented. In FIG. 24, client computer 52 and server computer 54 include respective sets of internal components 800a, 800b, and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, a pivot table creator program 67, an exposable functions program 68, and a similar functionality analysis program 66 are stored on one or more of the computer-readable tangible storage devices 830 for execution by one or more of the processors 820 via one or more of the RAMs 822 (which typically include cache memory). In the embodiment illustrated in FIG. 24, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A pivot table creator program 67, an exposable functions program 68, and/or a similar functionality analysis program 66, can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. A pivot table creator program 67, an exposable functions program 68, and/or a similar functionality analysis program 66 can be downloaded to client computer 52 and server computer 54 from an external computer via a network (for example, the Internet, a local area network or other, wide area network) and network adapter or interface 836. From the network adapter or interface 836, a pivot table creator program 67, an exposable functions program 68, and a similar functionality analysis program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

A pivot table creator program 67, an exposable functions program 68, and a similar functionality analysis program 66 can be written in various programming languages including low-level, high-level, object-oriented or non object-oriented languages. Alternatively, the functions of a pivot table creator program 67, an exposable functions program 68, and a similar functionality analysis program 66 can be implemented in whole or in part by computer circuits and other hardware (not shown).

Based on the foregoing, a computer system, method, and program product have been disclosed for dynamically offering upgraded services in a network. However, numerous modifications and substitutions can be made without deviating from the scope of the present invention. Therefore, the present invention has been disclosed by way of example and not limitation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of dynamically offering upgraded services in a network comprising functions, the method comprising a computer performing the steps of:
    a) applying a similar functionality analysis on the functions of a network, comprising the steps of the computer:
        i) retrieving a plurality of candidate services from the network, each functions having a description, at least one attribute, and a name;
        ii) for each function, determining whether the name is the same or similar to a name of another function and if the name is not the same or similar to any other function, continuing with the analysis at step (a)(vi);
        iii) for each function, determining whether the description is the same or similar to a description of another function; and if the description of a function is not the same or similar to the description of another function, determining whether the name of the function corresponds to a filter used in the network,
            if the name of the function corresponds to a filter used in the network, continuing with the analysis at step (a)(viii); otherwise continuing with the analysis at step (a)(vi);
        iv) determining whether there is a common name which can represent the plurality of functions being compared;
            if there is a common name which can represent the plurality of functions being compared, linking each of the plurality of functions with the common name and continuing with the analysis at step (a)(ix);
        v) for all functions which are not linked to a common name, continuing with the analysis at step (a)(ix);
        vi) for each function, determining whether the name is compliant with a verb and noun guide; and if the name is noncompliant with the verb and noun guide:
            if the function is not to be reanalyzed, deleting the function and continuing the analysis at step (a)(ix); and
            if the function is to be reanalyzed, returning to step (a)(i);
        vii) for each function, determining whether a proper pattern is being used; if the proper pattern is not being used: if the function is not to be reanalyzed, deleting the function and continuing the analysis at step (a)(ix); and if the function is to be reanalyzed, returning to step (a)(i);

viii) for function, determining if there is a facade in which the function can be associated with and if there is a facade that can be associated with the function, associating the function with the facade for access by a user through the facade; and ix) storing the plurality of functions in a repository;

b) retrieving the plurality of functions stored by the similar functionality analysis from the repository, and creating a pivot table;

c) categorizing the functions within the pivot table;

d) filtering the pivot table by a functional area of the pivot table;

e) recreating the pivot table based on the functional area; and f) differentiating exposable functions within the pivot table from non-exposable functions by attributes of the functions to determine which functions provide service to more than one consumer and are invoked through a standardized interface.

2. The method of claim 1, further comprising the step, after step (f), of sending results of step (f) to a service modeling toolkit, to evaluate the functions for exposure decisions.

3. The method of claim 1, wherein the step (f) of the computer differentiating the exposable functions within the pivot table from non-exposable functions by attributes of the functions further comprises the steps of the computer:

i) for all functions, populating all attributes of the functions;

ii) for all functions, determining if the function is a business activity, and if the function is not a business activity, continuing with analysis at step (f)(iv), iii) for all functions, determining whether the business activity is repeatable within a same sub-process; and indicating the function as a service; and if the business activity is unrepeatable within the same sub-process, indicate the function as a function;

iv) for functions, determining if the function is from similar functionality analysis; if the function is not from similar functionality analysis, removing the function;

v) for all functions, determining whether the function is a filter which can be part of the facade and indicating the function as a function, and if the function is not a filter which can be part of the facade, continuing with analysis at step (f) (vi);

vi) for all functions, determining whether the function is reusable across different scenarios and indicating the function as a service; if the function is not reusable across different scenarios, continuing with analysis at step (f)(vii); and vii) for all functions, determining whether the function is not reusable across different scenarios but valuable to business, indicating the function as a service, and if the function is not valuable to business, indicating the function as function.

4. The method of claim 1, wherein the pivot table comprises at least one function defined by a name, operation of the function, functional area, business type activity and function type.

5. The method of claim 1, wherein after step (a)(viii), the computer determining if there is not a facade in which the function can be associated, determining if the function is sufficiently related to other functions, such that a facade is created to relate the sufficiently related functions under the facade.

6. A computer program product for dynamically offering upgraded services in a network comprising functions, the computer program product comprising:

a computer comprising at least one processor, one or more memories, and one or more computer-readable, storage devices having program instructions embodied therewith, the program instructions executable by the computer;

a) program instructions, stored on at least one of the one or more storage devices, to apply a similar functionality analysis on the functions of a network, comprising program instructions to:

i) retrieve a plurality of candidate services from the network, each functions having a description, at least one attribute, and a name;

ii) for each function, determine whether the name is the same or similar to a name of another function and if the name is not the same or similar to any other function, continue with the analysis at step (a)(vi);

iii) for each function, determine whether the description is the same or similar to a description of another function; and if the description of a function is not the same or similar to the description of another function, determine whether the name of the function corresponds to a filter used in the network, if the name of the function corresponds to a filter used in the network, continue with the analysis at step (a)

(viii); otherwise continue with the analysis at step (a)(vi);

iv) determine whether there is a common name which can represent the plurality of functions being compared;

if there is a common name which can represent the plurality of functions being compared, linking each of the plurality of functions with the common name and continue with the analysis at step (a)(ix);

v) for all functions which are not linked to a common name, continue with the analysis at step (a)(ix);

vi) for each function, determine whether the name is compliant with a verb and noun guide; and if the name is noncompliant with the verb and noun guide:

if the function is not to be reanalyzed, delete the function and continue the analysis at step (a)(ix); and →if the function is to be reanalyzed, return to step (a)(i);

vii) for each function, determine whether a proper pattern is being used; if the proper pattern is not being used:

if the function is not to be reanalyzed, delete the function and continue the analysis at step (a)(ix); and if the function is to be reanalyzed, return to step (a)(i);

viii) for function, determine if there is a facade in which the function can be associated with and if there is a facade that can be associated with the function, associate the function with the facade for access by a user through the facade; and ix) store the plurality of functions in a repository;

b) program instructions, stored on at least one of the one or more storage devices, to retrieve the plurality of functions stored by the similar functionality analysis from the repository, and create a pivot table;

c) program instructions, stored on at least one of the one or more storage devices, to categorize the functions within the pivot table;

d) program instructions, stored on at least one of the one or more storage devices, to filter the pivot table by a functional area of the pivot table;

e) program instructions, stored on at least one of the one or more storage devices, to recreate the pivot table based on the functional area; and f) program instructions, stored on at least one of the one or more storage devices, to differentiate exposable functions within the pivot table from non-exposable functions by attributes of the functions to determine which functions provide service to more than one consumer and are invoked through a standardized interface.

7. The computer program product of claim 6, further comprising program instructions, stored on at least one of the one or more storage devices, to, after program instructions (f), of send results of step (f) to a service modeling toolkit, to evaluate the functions for exposure decisions.

8. The computer program product of claim 6, wherein the program instructions (f) to differentiate the exposable functions within the pivot table from non-exposable functions by attributes of the functions further comprises the program instructions, stored on at least one of the one or more storage devices, to:

i) for all functions, populate all attributes of the functions;

ii) for all functions, determine if the function is a business activity, and if the function is not a business activity, continue with analysis at step (f)(iv), iii) for all functions, determine whether the business activity is repeatable within a same sub-process; and indicate the function as a service; and if the business activity is unrepeatable within the same sub-process, indicate the function as a function;

iv) for functions, determine if the function is from similar functionality analysis; if the function is not from similar functionality analysis, remove the function;

v) for all functions, determine whether the function is a filter which can be part of the facade and indicate the function as a function, and if the function is not a filter which can be part of the facade, continue with analysis at step (f) (vi);

vi) for all functions, determine whether the function is reusable across different scenarios and indicate the function as a service; if the function is not reusable across different scenarios, continue with analysis at step (f) (vii); and vii) for all functions, determining whether the function is not reusable across different scenarios but valuable to business, indicating the function as a service, and if the function is not valuable to business, indicating the function as function.

9. The computer program product of claim 6, wherein the pivot table comprises at least one function defined by a name, operation of the function, functional area, business type activity and function type.

10. The computer program product of claim 6, wherein after program instructions (a)(viii), determine if there is not a facade in which the function can be associated, determine if the function is sufficiently related to other functions, such that a facade is created to relate the sufficiently related functions under the facade.

11. A computer system for dynamically offering upgraded services in a network comprising functions, the computer system comprising:
one or more processors, one or more computer-readable memories and one or more computer-readable, tangible storage devices;

a) program instructions, stored on at least one of the one or more storage devices for execution by at least one of the one or more processors via at least one of the one or more memories, to apply a similar functionality analysis on the functions of a network, comprising program instructions to:

i) retrieve a plurality of candidate services from the network, each functions having a description, at least one attribute, and a name;

ii) for each function, determine whether the name is the same or similar to a name of another function and if the name is not the same or similar to any other function, continue with the analysis at step (a)(vi);

iii) for each function, determine whether the description is the same or similar to a description of another function; and if the description of a function is not the same or similar to the description of another function, determine whether the name of the function corresponds to a filter used in the network, if the name of the function corresponds to a filter used in the network, continue with the analysis at step (a)(viii); otherwise continue with the analysis at step (a)(vi);

iv) determine whether there is a common name which can represent the plurality of functions being compared;

if there is a common name which can represent the plurality of functions being compared, linking each of the plurality of functions with the common name and continue with the analysis at step (a)(ix);

v) for all functions which are not linked to a common name, continue with the analysis at step (a)(ix);

vi) for each function, determine whether the name is compliant with a verb and noun guide; and if the name is noncompliant with the verb and noun guide:

if the function is not to be reanalyzed, delete the function and continue the analysis at step (a)(ix); and if the function is to be reanalyzed, return to step (a)(i);

vii) for each function, determine whether a proper pattern is being used; if the proper pattern is not being used:

if the function is not to be reanalyzed, delete the function and continue the analysis at step (a)(ix); and if the function is to be reanalyzed, return to step (a)(i);

viii) for function, determine if there is a facade in which the function can be associated with and if there is a facade that can be associated with the function, associate the function with the facade for access by a user through the facade; and ix) store the plurality of functions in a repository;

b) program instructions, stored on at least one of the one or more storage devices for execution by at least one of the one or more processors via at least one of the one or more memories, to retrieve the plurality of functions stored by the similar functionality analysis from the repository, and create a pivot table;

c) program instructions, stored on at least one of the one or more storage devices for execution by at least one of the one or more processors via at least one of the one or more memories, to categorize the functions within the pivot table;

d) program instructions, stored on at least one of the one or more storage devices for execution by at least one of the one or more processors via at least one of the one or more memories, to filter the pivot table by a functional area of the pivot table;

e) program instructions, stored on at least one of the one or more storage devices for execution by at least one of the one or more processors via at least one of the one or more memories, to recreate the pivot table based on the functional area; and f) program instructions, stored on at least one of the one or more storage devices for execution by at least one of the one or more processors via at least one of the one or more memories, to differentiate exposable functions within the pivot table from non-exposable functions by attributes of the functions to determine which functions provide service to more than one consumer and are invoked through a standardized interface.

12. The computer system of claim 11, further comprising program instructions, stored on at least one of the one or more storage devices for execution by at least one of the one or more processors via at least one of the one or more memories, to, after program instructions (f), of send results of step (f) to a service modeling toolkit, to evaluate the functions for exposure decisions.

13. The computer system of claim 11, wherein the program instructions (f) to differentiate the exposable functions within the pivot table from non-exposable functions by attributes of the functions further comprises the program instructions, stored on at least one of the one or more storage devices for execution by at least one of the one or more processors via at least one of the one or more memories, to:

i) for all functions, populate all attributes of the functions;

ii) for all functions, determine if the function is a business activity, and if the function is not a business activity, continue with analysis at step (f)(iv), iii) for all functions, determine whether the business activity is repeatable within a same sub-process; and indicate the function as a service; and if the business activity is unrepeatable within the same sub-process, indicate the function as a function;

iv) for functions, determine if the function is from similar functionality analysis; if the function is not from similar functionality analysis, remove the function;

v) for all functions, determine whether the function is a filter which can be part of the facade and indicate the function as a function, and if the function is not a filter which can be part of the facade, continue with analysis at step (f) (vi);

vi) for all functions, determine whether the function is reusable across different scenarios and indicate the function as a service; if the function is not reusable across different scenarios, continue with analysis at step (f) (vii); and vii) for all functions, determining whether the function is not reusable across different scenarios but valuable to business, indicating the function as a service, and if the function is not valuable to business, indicating the function as function.

14. The computer system of claim 11, wherein the pivot table comprises at least one function defined by a name, operation of the function, functional area, business type activity and function type.

15. The computer system of claim 11, wherein after program instructions (a)(viii), determine if there is not a facade in which the function can be associated, determine if the function is sufficiently related to other functions, such that a facade is created to relate the sufficiently related functions under the facade.

* * * * *